United States Patent
Wu et al.

(10) Patent No.: US 11,888,678 B2
(45) Date of Patent: Jan. 30, 2024

(54) CONFIGURATION ERROR INFORMATION TRANSMISSION METHOD AND DEVICE

(71) Applicant: Huawei Technologies Co., Ltd., Shenzhen (CN)

(72) Inventors: Sijin Wu, Beijing (CN); Yinye Zhang, Nanjing (CN); Anjie Wang, Beijing (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 18/173,868

(22) Filed: Feb. 24, 2023

(65) Prior Publication Data

US 2023/0198827 A1    Jun. 22, 2023

Related U.S. Application Data

(63) Continuation of application No. PCT/CN2021/013255, filed on Aug. 18, 2021.

(30) Foreign Application Priority Data

Aug. 26, 2020  (CN) ......................... 202010872050.4

(51) Int. Cl.
*H04L 41/0895* (2022.01)
*H04L 41/0604* (2022.01)
(Continued)

(52) U.S. Cl.
CPC ...... *H04L 41/0609* (2013.01); *H04L 41/0866* (2013.01); *H04L 12/287* (2013.01)

(58) Field of Classification Search
CPC ............. H04L 41/0609; H04L 41/0866; H04L 12/287; H04L 41/0631; H04L 41/0895; H04L 41/0686; H04L 43/065
See application file for complete search history.

(56) References Cited

U.S. PATENT DOCUMENTS

2017/0288813 A1* 10/2017 Khan .................... H04L 1/0045
2020/0403729 A1* 12/2020 Khan .................... H04L 1/0045
(Continued)

FOREIGN PATENT DOCUMENTS

EP    2166699 A1    3/2010

OTHER PUBLICATIONS

"ZTE releases carrier-class vBRAS white paper", Pivotal Sources, New Delhi, May 1, 2017.*
(Continued)

*Primary Examiner* — Aftab N. Khan
(74) *Attorney, Agent, or Firm* — Slater Matsil, LLP

(57) ABSTRACT

This application provides a configuration error information transmission method and a device. When generating a plurality of pieces of configuration error information after configuring a batch of configuration parameter groups, a user plane network element may report the configuration error information to a control plane network element based on reporting priorities of the configuration error information. According to embodiments, reporting can be performed based on the reporting priorities of the configuration error information. In this way, a user or the control plane network element can configure, by configuring the reporting priorities, an order of precedence of the configuration error information to be reported by the user plane network element.

18 Claims, 10 Drawing Sheets

(51) Int. Cl.
*H04L 41/0866* (2022.01)
*H04L 12/28* (2006.01)

(56) References Cited

U.S. PATENT DOCUMENTS

2023/0132861 A1* 5/2023 Song .................. H04L 45/28
709/224
2023/0198827 A1* 6/2023 Wu .................. H04L 41/0609
709/223

OTHER PUBLICATIONS

ZTE helps China Mobile Complete cross-vendor test of SDN Single Layer Controller, Pivotal Sources, New Delhi Dec. 10, 2020.*
"Building E2E IP networks for the 5G & Cloud Era", ICT monitor Worldwide, Amman, Apr. 3, 2019.*
ZTE Unveils, New NFV product: ZXR10 V6000 vRouter & vMSR, Pivotal Sources, New Delhi, Jun. 30, 2017.*
"Openflow Management and Configuration Protocol (OF-Config 1.1.1)", Open Networking Foundation, Version 1.1.1, Mar. 23, 2013, 173 Pages.
Vuong, Q., et al., "Distributed Event Monitoring for Software Defined Networks", 2015 International Conference on Advanced Computing and Applications, Nov. 23-25, 2015, 8 Pages.

* cited by examiner

CONFIGURATION ERROR INFORMATION TRANSMISSION METHOD AND DEVICE

CROSS-REFERENCE TO RELATED APPLICATIONS

This application is a continuation of International Application No. PCT/CN2021/113255, filed on Aug. 18, 2021, which claims priority to Chinese Patent Application No. 202010872050.4, filed on Aug. 26, 2020. The disclosures of the aforementioned applications are hereby incorporated by reference in their entireties.

TECHNICAL FIELD

This application relates to the field of communication technologies, and in particular, to a configuration error information transmission method and a device.

BACKGROUND

To solve problems such as low resource utilization, complex management and maintenance, and slow service provisioning of a conventional broadband remote access server (BRAS), this field introduces a software defined network (SDN) technology and a network function virtualization (NFV) technology into a BRAS, and proposes a virtual broadband remote access server (vBRAS) architecture, to implement separation and decoupling of a user plane (UP) and a control plane (CP). Therefore, the vBRAS architecture includes a vBRAS-UP and a vBRAS-CP.

South interfaces between the vBRAS-UP and the vBRAS-CP include a service interface, a management interface, and a control interface. The vBRAS-CP may perform configuration delivery and configuration consistency verification on the vBRAS-UP through the management interface, to implement configuration synchronization between the vBRAS-CP and the vBRAS-UP.

A process in which the vBRAS-CP performs configuration delivery and configuration consistency verification on the vBRAS-UP includes the following steps.

1. The vBRAS-CP sends target configuration information to the vBRAS-UP via a remote procedure call protocol (RPC) packet. The target configuration information includes a plurality of configuration parameter groups. Each configuration parameter group is for configuring one service or instance.
2. The vBRAS-UP performs configuration based on the received target configuration information, and returns an RPC-reply packet to the vBRAS-CP based on a configuration result.

When the vBRAS-UP successfully configures all configuration parameter groups in the target configuration information, the RPC-reply packet indicates that the configuration succeeds. When failing to configure any configuration parameter group, the vBRAS-UP generates configuration error information indicating that the configuration parameter group fails to be configured, and the RPC-reply packet indicates that the configuration fails, and carries a small quantity of pieces of configuration error information that is generated first.

3. When determining, based on the RPC-reply packet, that the vBRAS-UP successfully performs configuration, the vBRAS-CP sends an effectivity indication packet (a commit packet) to the vBRAS-UP, to indicate that the target configuration information configured this time takes effect. When determining, based on the RPC-reply packet, that the vBRAS-UP fails to perform configuration, the vBRAS-CP sends a rollback indication packet (a discard commit packet) to the vBRAS-UP, to indicate the vBRAS-UP to roll back to a previous configuration. In addition, the vBRAS-CP may further generate a configuration failure record based on at least one piece of configuration error information in the RPC-reply packet, and update the configuration failure record to an operation log. In this way, the vBRAS-CP may generate an alarm message based on the configuration failure record in the operation log, to facilitate user query.

The configuration failure record indicates that a configuration parameter of a service fails to be configured.

When the vBRAS-CP performs batch configuration, the vBRAS-UP may generate a large quantity of pieces of configuration error information. However, due to poor flexibility of a conventional configuration error information transmission mode, the vBRAS-UP can report only the small quantity of pieces of configuration error information that is generated first. This makes it difficult to search for a root cause of a configuration error, locate a problem, and perform operations and maintenance.

SUMMARY

This application provides a configuration error information transmission method and a device, to improve flexibility of reporting configuration error information by a vBRAS-UP to a vBRAS-CP.

According to a first aspect, an embodiment of this application provides a configuration error information transmission method. The method includes the following steps.

A user plane network element receives a first configuration packet from a control plane network element, where the first configuration packet carries a plurality of configuration parameter groups, and any one of the plurality of configuration parameter groups belongs to one service. The user plane network element generates a plurality of pieces of configuration error information after performing configuration based on the plurality of configuration parameter groups, where any piece of configuration error information corresponds to one configuration parameter group, and the any piece of configuration error information indicates that the user plane network element fails to configure the configuration parameter group corresponding to the configuration error information. The user plane network element sends, to the control plane network element, a first configuration reply packet including to-be-reported error information, where the to-be-reported error information includes first configuration error information in the plurality of pieces of configuration error information, the to-be-reported error information does not include second configuration error information in the plurality of pieces of configuration error information, and a reporting priority of the first configuration error information is higher than or equal to a reporting priority of the second configuration error information.

According to the method, the user plane network element can perform reporting based on reporting priorities of the configuration error information. In this way, a user or the control plane network element can configure, by configuring the reporting priorities, an order of precedence of the configuration error information to be reported by the user plane network element, so that flexibility of reporting the configuration error information by the user plane network element to the control plane network element is improved, and efficiency of searching for a root cause of a configuration error, locating a problem, and performing operations and maintenance by the control plane network element can be improved.

In a possible design, the reporting priority of the first configuration error information is a reporting priority of a service to which a configuration parameter group corresponding to the first configuration error information belongs, and the reporting priority of the second configuration error information is a reporting priority of a service to which a configuration parameter group corresponding to the second configuration error information belongs.

According to the design, the user plane network element may determine, based on a reporting priority of a service, a reporting priority of configuration error information corresponding to a configuration parameter group belonging to the service.

In a possible design, before the user plane network element sends, to the control plane network element, the first configuration reply packet including the to-be-reported error information, the user plane network element may determine a reporting priority of at least one service, where the at least one service includes a service to which at least one of the plurality of configuration parameter groups belongs; and determine the to-be-reported error information in the plurality of pieces of configuration error information based on the reporting priority of the at least one service.

According to the design, the user plane network element may determine the to-be-reported error information based on the reporting priority of the at least one service, so that configuration error information related to a service having a higher reporting priority can be preferentially reported.

In a possible design, the user plane network element may determine the to-be-reported error information by using the following step.

The user plane network element determines the to-be-reported error information in the plurality of pieces of configuration error information based on the reporting priority of the at least one service and a constraint condition, where the constraint condition is that a quantity of pieces of the to-be-reported error information is a target quantity; or the constraint condition is that a quantity of services to which a configuration parameter group corresponding to the to-be-reported error information belongs is a target quantity.

According to the design, the user plane network element may select the to-be-reported error information by using a quantity of pieces of configuration error information that needs to be reported as a constraint or by using a quantity of services that need to be reported as a constraint.

In a possible design, when the constraint condition is that the quantity of pieces of the to-be-reported error information is the target quantity, the user plane network element determines the to-be-reported error information in the plurality of pieces of configuration error information based on the reporting priority of the at least one service and the constraint condition in the following steps.

The user plane network element adds the first configuration error information to a reporting record when a quantity of pieces of configuration error information in the reporting record is less than the target quantity; or when a quantity of pieces of configuration error information in a reporting record is equal to the target quantity, the user plane network element determines that the reporting priority of the first configuration error information is higher than a reporting priority of third configuration error information in the reporting record, and the user plane network element deletes the third configuration error information in the reporting record, and adds the first configuration error information to the reporting record. Finally, the user plane network element determines that the to-be-reported error information is the configuration error information included in the reporting record.

According to the design, the user plane network element may select, from the plurality of pieces of configuration error information, configuration error information having a higher reporting priority as the to-be-reported error information for reporting.

A larger quantity of alarm messages that are generated by the control plane network element and that are related to the user plane network element is more helpful for the user to search for the root cause of the configuration error, locate the problem, and perform operations and maintenance by using the alarm messages. However, a quantity of alarm messages of the user plane network element stored by the control plane network element is usually limited. That is, the quantity of alarm messages of the user plane network element stored by the control plane network element is less than or equal to a preset maximum quantity. For example, the maximum quantity may be 100, 200, or the like. In a possible design, to enable the quantity of alarm messages generated by the control plane network element based on the to-be-reported error information reported by the user plane network element to be as close as possible to the maximum quantity, the target quantity in the constraint condition may be determined based on the maximum quantity. For example, a value of the target data is close to or the same as that of the maximum quantity, and the value of the target quantity may be specifically set based on a specific scenario. For example, the target quantity may be greater than or equal to the maximum quantity.

In a possible design, to enable the user plane network element to report configuration error information to the control plane network element as much as possible, the target quantity is determined based on a maximum volume of data carried by the first configuration reply packet.

In a possible design, the user plane network element may determine the reporting priority of the at least one service in, but not limited to, the following manners.

Manner 1: The user plane network element obtains a preset reporting priority of the at least one service.

Manner 2: The user plane network element obtains first priority configuration information sent by the control plane network element, where the first priority configuration information is for configuring the reporting priority of the at least one service. The user plane network element determines the reporting priority of the at least one service based on the first priority configuration information.

Manner 3: The user plane network element obtains second priority configuration information sent by the control plane network element, where the second priority configuration information is for configuring a priority of a first service in the at least one service; the user plane network element determines the priority of the first service based on the second priority configuration information; and the user plane network element obtains a preset reporting priority of a second service in the at least one service, or the user plane network element adjusts a reporting priority of a second service based on the priority of the first service.

In the foregoing design, flexibility of obtaining a reporting priority of a service by the user plane network element can be improved.

In a possible design, the to-be-reported error information further includes fourth configuration error information in the plurality of pieces of configuration error information, and a service to which a configuration parameter group corresponding to the fourth configuration error information belongs is different from the service to which the configuration parameter group corresponding to the first configuration error information belongs.

According to the design, the to-be-reported error information may include configuration error information related to a plurality of services.

In a possible design, the method is applied to a communication system in which a control plane is separated from a user plane, the user plane network element is a user plane network element in the communication system, and the control plane network element is a control plane network element in the communication system. For example, in a communication system shown in FIG. 1 or FIG. 2, the user plane network element may be a vBRAS-UP, and the control plane network element may be a vBRAS-CP.

According to a second aspect, an embodiment of this application provides a configuration error information transmission method. The method includes the following steps.

A control plane network element sends a first configuration packet to a user plane network element, where the first configuration packet carries a plurality of first configuration parameter groups, and any one of the plurality of first configuration parameter groups belongs to one service. The control plane network element receives a first configuration reply packet from the user plane network element, where the first configuration reply packet includes to-be-reported error information, the to-be-reported error information included in the first configuration reply packet includes first configuration error information, the to-be-reported error information included in the first configuration reply packet does not include second configuration error information, a reporting priority of the first configuration error information is higher than or equal to a reporting priority of the second configuration error information, and the first configuration error information is generated after the user plane network element performs configuration based on any one of the plurality of first configuration parameter groups.

According to the method, the user plane network element can perform reporting based on reporting priorities of configuration error information. In this way, a user or the control plane network element can configure, by configuring the reporting priorities, an order of precedence of the configuration error information to be reported by the user plane network element, so that flexibility of reporting the configuration error information by the user plane network element to the control plane network element is improved, and efficiency of searching for a root cause of a configuration error, locating a problem, and performing operations and maintenance by the control plane network element can be improved.

In a possible design, the reporting priority of the first configuration error information is a reporting priority of a service to which a configuration parameter group corresponding to the first configuration error information belongs, and the reporting priority of the second configuration error information is a reporting priority of a service to which a configuration parameter group corresponding to the second configuration error information belongs.

In a possible design, a quantity of pieces of the to-be-reported error information is a target quantity; or a quantity of services to which a configuration parameter group corresponding to the to-be-reported error information belongs is a target quantity.

In a possible design, the target quantity is determined based on a maximum quantity of alarm messages of the user plane network element that can be stored by the control plane network element, and the alarm message is generated by the control plane network element based on the to-be-reported error information reported by the user plane network element; or the target quantity is determined based on a maximum volume of data carried by the first configuration reply packet.

In a possible design, when the target quantity is determined based on the maximum quantity of alarm messages of the user plane network element that can be stored by the control plane network element, the target quantity is greater than or equal to the maximum quantity.

In a possible design, the control plane network element may further send priority configuration information to the user plane network element, where the priority configuration information is for configuring a reporting priority of at least one service, and the at least one service includes a service to which at least one of the plurality of first configuration parameter groups belongs.

According to the design, the control plane network element may flexibly configure a reporting priority of a service.

In a possible design, after the control plane network element receives the first configuration reply packet from the user plane network element, the control plane network element may further generate a configuration failure record of the user plane network element based on first to-be-reported error information; and generate at least one alarm message of the user plane network element based on the configuration failure record.

In a possible design, the first to-be-reported error information includes the first configuration error information and third configuration error information, where the configuration parameter group corresponding to the first configuration error information belongs to a first service, and a configuration parameter group corresponding to the third configuration error information belongs to a second service; and the configuration failure record indicates that the configuration parameter group of the first service and the configuration parameter group of the second service fail to be configured; and the at least one alarm message includes a first alarm message and a second alarm message, where the first alarm message is for alarming a configuration failure of the configuration parameter group of the first service, and the second alarm message is for alarming a configuration failure of the configuration parameter group of the second service.

According to the design, the control plane network element may support recording of a plurality of services in one configuration failure record, so that a plurality of alarm messages can be generated subsequently based on the configuration failure record. In this way, a quantity of pieces of alarm information may be enriched, to facilitate searching for the root cause of the configuration error, locating the problem, and performing operations and maintenance based on the richer alarm information subsequently.

In a possible design, the method further includes the following steps.

The control plane network element obtains target configuration information, where the target configuration information includes a plurality of configuration parameter groups. The control plane network element determines the plurality of first configuration parameter groups and a plurality of second configuration parameter groups in the plurality of configuration parameter groups included in the target configuration information, where any one of the plurality of first configuration parameter groups is different from any one of the plurality of second configuration parameter groups. The control plane network element sends a second configuration packet to the user plane network element, where the second configuration packet carries the plurality of second configuration parameter groups. The control plane network element receives a second configuration reply packet from the user plane network element, where the second configuration reply packet includes to-be-reported error information, and the to-be-reported error information included in the second configuration reply packet is generated after the user plane network element performs configuration based on at least one of the plurality of second configuration parameter groups.

In each configuration delivery procedure, the control plane network element sends a configuration packet to the user plane network element, and the user plane network element feeds back a configuration reply packet to the control plane network element for the configuration packet. Therefore, in this design, the control plane network element may split the plurality of configuration parameter groups in the target configuration information into a plurality of sets, and deliver the corresponding sets by using a plurality of configuration delivery procedures. Compared with a method in which the plurality of configuration parameter groups in the target configuration information are configured and delivered in a centralized manner, according to the design, the user plane network element may feed back the configuration reply packet in each configuration delivery procedure, so that opportunities of reporting the configuration error information by the user plane network element and a quantity of pieces of reporting the configuration error information by the user plane network element are increased, and the control plane network element can obtain the configuration error information as much as possible.

In a possible design, the control plane network element may obtain the target configuration information in the following manners.

Manner 1: The control plane network element obtains the target configuration information sent by a management device.

Manner 2: The control plane network element obtains the target configuration information input by a user.

Manner 3: The control plane network element obtains the target configuration information in a configuration consistency verification process of the control plane network element and the user plane network element.

In a possible design, the method is applied to a communication system in which a control plane is separated from a user plane, the user plane network element is a user plane network element in the communication system, and the control plane network element is a control plane network element in the communication system.

According to a third aspect, an embodiment of this application provides a user plane network element, including units configured to perform the steps in the first aspect.

According to a fourth aspect, an embodiment of this application provides a control plane network element, including units configured to perform the steps in the second aspect.

According to a fifth aspect, an embodiment of this application provides a communication device, including at least one processing element and at least one storage element. The at least one storage element is configured to store a program and data, and the at least one processing element is configured to read and execute the program and data that are stored in the storage element, so that the method provided in any one of the foregoing aspects of this application is implemented.

According to a sixth aspect, an embodiment of this application provides a communication system in which a user plane is separated from a control plane. The communication system includes a user plane network element and a control plane network element. The user plane network element is configured to implement the method provided in the first aspect, and the control plane network element is configured to implement the method provided in the second aspect.

According to a seventh aspect, an embodiment of this application further provides a computer program. When the computer program is run on a computer, the computer is enabled to perform the method provided in any one of the foregoing aspects.

According to an eighth aspect, an embodiment of this application further provides a computer-readable storage medium. The computer-readable storage medium stores a computer program. When the computer program is executed by a computer, the computer is enabled to perform the method provided in any one of the foregoing aspects.

According to a ninth aspect, an embodiment of this application further provides a chip. The chip is configured to read a computer program stored in a memory, to perform the method provided in any one of the foregoing aspects.

According to a tenth aspect, an embodiment of this application further provides a chip system. The chip system includes a processor, configured to support a computer apparatus in implementing the method provided in any one of the foregoing aspects. In a possible design, the chip system further includes a memory. The memory is configured to store a program and data that are necessary for the computer apparatus. The chip system may include a chip, or may include the chip and another discrete component.

DETAILED DESCRIPTION OF ILLUSTRATIVE EMBODIMENTS

Figure 1:
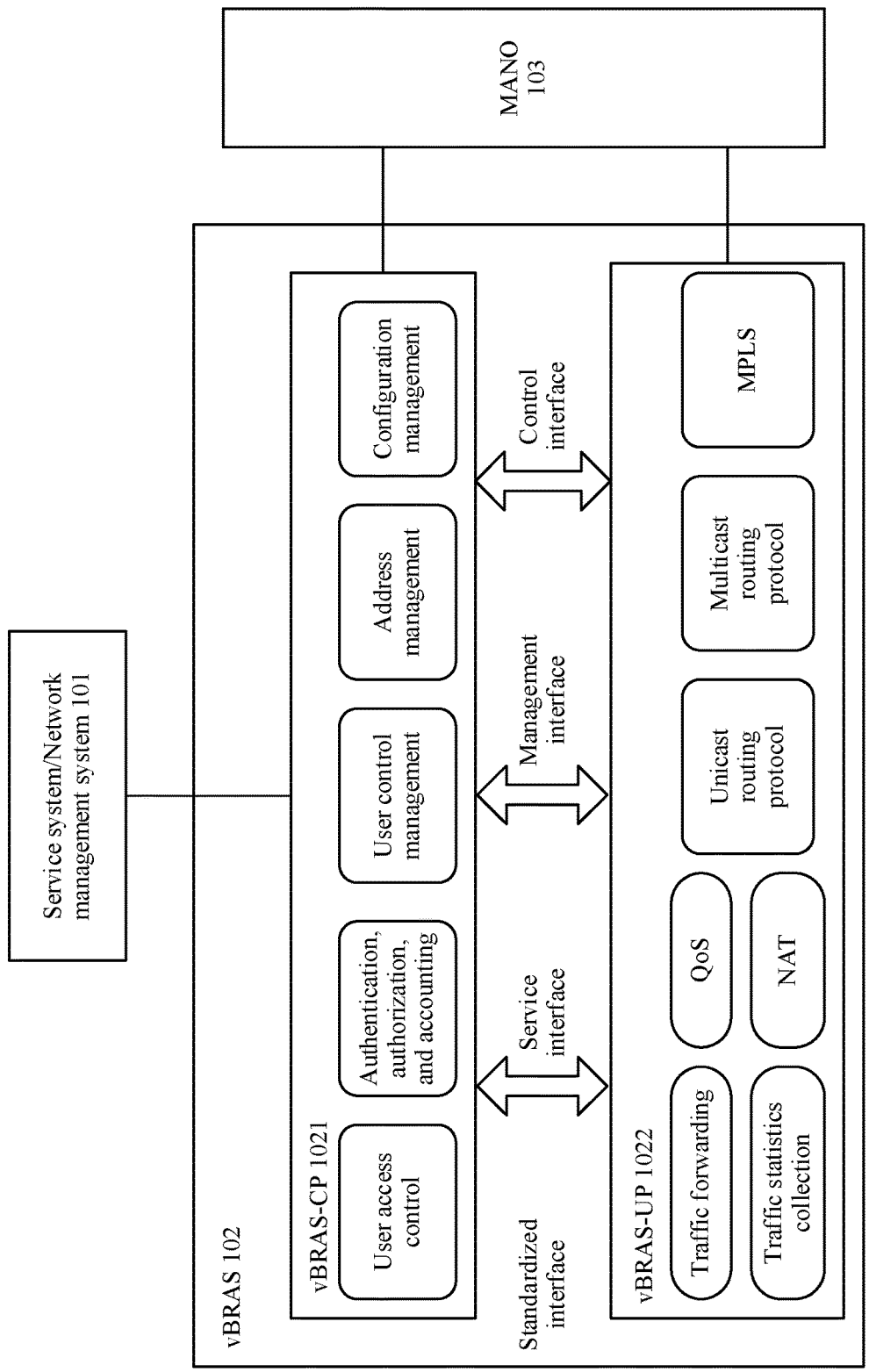
FIG. 1 is a diagram of an architecture of a communication system according to an embodiment of this application.

This application provides a configuration error information transmission method and a device, to improve flexibility of reporting configuration error information by a vBRAS-UP to a vBRAS-CP. The method and the device are based on a same technical concept. Because problem resolving principles of the method and the device are similar, for implementation of the device and the method, refer to each other, and repeated parts are not described again.

In the solutions provided in embodiments of this application, when generating a plurality of pieces of configuration error information after configuring a batch of configuration parameter groups, a user plane network element may report the configuration error information to a control plane network element based on reporting priorities of the configuration error information. In a conventional method, the user plane network element can report only configuration error information that is generated first. In comparison, in this method, reporting can be performed based on the reporting priorities of the configuration error information. In this way, a user or the control plane network element can configure, by configuring the reporting priorities, an order of precedence of the configuration error information to be reported by the user plane network element, so that flexibility of reporting the configuration error information by the user plane network element to the control plane network element is improved, and efficiency of searching for a root cause of a configuration error, locating a problem, and performing operations and maintenance by the control plane network element can be improved.

In the following, some terms in this application are explained and described, to facilitate understanding of the terms for a person skilled in the art.

(1) A vBRAS architecture is proposed for introducing an SDN technology and an NFV technology into a BRAS in the communications field, and can implement separation and decoupling of a UP and a CP. Therefore, the vBRAS architecture includes the following two types of network elements: a vBRAS-UP network element and a vBRAS-CP network element.

(2) The vBRAS-CP network element is also referred to as a control plane network element, and may be abbreviated as a vBRAS-CP. The vBRAS-CP is a control management component in the vBRAS architecture, and is mainly responsible for functions such as user control management (UCM), user access control, user authentication, authorization, and accounting, address management (AM), and configuration management (CM).

(3) The vBRAS-UP network element is also referred to as a user plane network element or a user plane network element, and may be abbreviated as a vBRAS-UP. The vBRAS-UP is used as a layer 3 network element edge and user policy implementation component in the vBRAS architecture, and is mainly responsible for user plane functions such as traffic forwarding (that is, user data packet forwarding), quality of service (QoS), traffic statistics collection, and network address translation (NAT). In addition, the vBRAS-UP may be further responsible for a pipe-type control plane function such as a unicast routing protocol, a multicast routing protocol, and multiprotocol label switching (MPLS), to implement traffic scheduling and traffic balancing.

(4) A configuration parameter group includes one configuration parameter, or a series of configuration-related configuration parameters. The vBRAS-CP/vBRAS-UP can generate one configuration parameter command for one configuration parameter group, to configure the configuration parameter group.

(5) Configuration error information, namely, error information, is in a one-to-one correspondence with a configuration parameter group, and indicates that the vBRAS-UP fails to configure the configuration parameter group corresponding to the configuration error information. That is, when the vBRAS-UP fails to configure one configuration parameter group, the vBRAS-UP generates one piece of configuration error information.

(6) A configuration packet includes at least one configuration parameter group, and is used by the vBRAS-CP to configure a parameter for the vBRAS-UP. For example, the configuration packet may be a remote procedure call (RPC) packet.

(7) A configuration reply packet corresponds to the configuration packet. After performing configuration based on the configuration parameter group included in the configuration packet, the vBRAS-UP returns the configuration reply packet to the vBRAS-CP based on a configuration result. Therefore, the configuration reply packet may indicate that the configuration succeeds (where all configuration parameter groups included in the configuration packet are successfully configured), or may indicate that the configuration fails (where at least one configuration parameter group included in the configuration packet fails to be configured).

It should be noted that, when the configuration reply packet indicates that the configuration fails, the configuration reply packet further carries configuration error information generated by the vBRAS-UP.

For example, when the configuration packet is the RPC packet, the configuration reply packet may be an RPC-reply packet, and configuration error information carried in the RPC-reply packet may be represented as RPC-error information.

(8) A service indicates a function, a service, or an application (APP) of the vBRAS architecture. For example, the service in the vBRAS architecture may be but is not limited to the following services: a service 1 (aclcu), a service 2 (cusrvcomm), a service 3 (cuqos), a service 4 (cucgn), a service 5 (cusc), a service 6 (cuBr), a service 7 (brascuofa), a service 8 (brascuif), a service 9 (brascuagent), a service 10 (ethernetcuadp), a service 11 (brascuipv6), a service 12 (brascuipv4), a service 13 (mcastcuadp), a service 14 (cubraskeychain), a service 15 (cuussl), a service 16 (timerange), and the like.

(9) The term "and/or" describes an association relationship between associated objects, and represents that three relationships may exist. For example, A and/or B may represent the following three cases: Only A exists, both A and B exist, and only B exists. The character "/" generally indicates an "or" relationship between the associated objects.

It should be noted that "a plurality of" in this application refers to two or more. "At least one" means one or more.

In addition, it should be understood that, in the descriptions of this application, terms such as "first" and "second" are merely for distinction and description, but cannot be understood as an indication or implication of relative importance, and cannot be understood as an indication or implication of a sequence.

The following describes embodiments of this application in detail with reference to the accompanying drawings.

FIG. 1 shows an architecture of a communication system to which a configuration error information transmission method is applicable according to an embodiment of this application. Refer to FIG. 1, the communication system may include a service system/network management system 101, a vBRAS 102, and a management and orchestration system (MANO) 103.

The service system/network management system 101 is mainly responsible for management functions such as access service, network management, a remote access dial in user service, IP address allocation, and policy configuration. The service system/network management system 101 implements the foregoing management functions mainly by using a management device. For example, the service system/network management system 101 may include at least one or a combination of the following management devices: a remote authentication dial in user service (RADIUS) server, a dynamic host configuration protocol (DHCP) server, a policy server, an element management system (EMS), and other servers.

The vBRAS 102 is obtained by introducing an SDN technology and an NFV technology into a conventional BRAS and separating and decoupling a UP and a CP of the BRAS. As shown in FIG. 1, the vBRAS 102 includes a vBRAS-CP 1021 and a vBRAS-UP 1022. The vBRAS-CP 1021 is deployed in a centralized manner by using a virtualization/cloudification technology, to implement unified management of a plurality of vBRAS-UPs 1022.

The vBRAS-CP 1021 is used as a control management component in the vBRAS 102, and is mainly responsible for functions such as UCM, user access control, user authentication, authorization, and accounting, AM, and CM.

The vBRAS-UP 1022 is mainly responsible for user plane functions such as traffic forwarding (that is, user data packet forwarding), QoS, traffic statistics collection, and NAT. In addition, the vBRAS-UP 1022 may be further responsible for pipe-type control plane functions such as a unicast routing protocol, a multicast routing protocol, and MPLS, to implement traffic scheduling and traffic balancing.

In an architecture of the vBRAS 102 with user-control separation, the vBRAS-CP 1021 and the vBRAS-UP 1022 are connected to and communicate with each other through a standardized interface. The standardized interface is also referred to as a south interface of the vBRAS-CP 1021. As shown in FIG. 1, the standardized interface between the vBRAS-CP 1021 and the vBRAS-UP 1022 may include a service interface, a management interface, and a control interface.

The service interface may use a virtual extensible local area network (VxLAN) technology to transfer a point to point protocol over ethernet (PPPoE) access control packet, a RADIUS authentication, authorization, and accounting packet, an IPoE packet, and a layer 2 tunneling protocol (L2TP) packet between the vBRAS-CP 1021 and the vBRAS-UP 1022.

The management interface may use a network configuration protocol (Netconf) technology or an openflow technology to implement configuration delivery and configuration consistency verification performed by the vBRAS-CP 1021 on the vBRAS-UP 1022. That is, the vBRAS-CP 1021 may send a configuration packet (for example, an RPC packet) to the vBRAS-UP 1022 through the management interface, and the vBRAS-UP 1022 may return a configuration reply packet (for example, an RPC-reply packet) to the vBRAS-CP 1021 through the management interface.

The control interface may use the openflow technology, so that the vBRAS-CP 1021 delivers a forwarding entry to the vBRAS-UP 1022, and the vBRAS-UP 1022 reports a service event to the vBRAS-CP 1021, to finally implement uniform management and control performed by the vBRAS-CP 1021 on behavior of the vBRAS-UP 1022.

The service system/network management system 101 and the vBRAS 102 are also connected through an interface, and are configured to implement interconnection between the service system/network management system 101 and the vBRAS 102 and uniformly invoking performed by the service system/network management system 101 on a function/capability of the vBRAS 102. The interface is also referred to as a north interface of the vBRAS-CP 1021.

In this communication system, because the vBRAS 102 is implemented by using the NFV technology, in an NFV architecture, the vBRAS-CP 1021 and the vBRAS-UP 1022 are virtualized network functions (VNF) obtained by virtualizing a hardware resource. The MANO 103 is an NFV-MANO, and is configured to monitor and manage VNFs such as the vBRAS-CP 1021 and the vBRAS-UP 1022.

It should be noted that the communication system shown in FIG. 1 is for describing the technical solutions in embodiments of this application more clearly, but does not constitute a limitation on the technical solutions provided in embodiments of this application. A person of ordinary skill in the art may know that with evolution of a network architecture and an update of a technology, the technical solutions provided in embodiments of this application are also applicable to another similar communication system.

Figure 2:
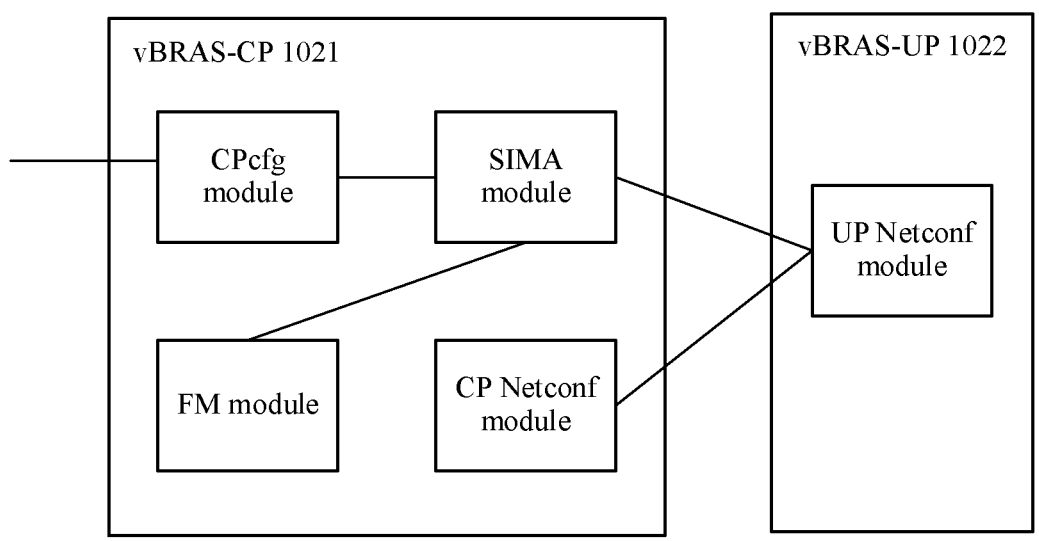
FIG. 2 is a schematic diagram of a function structure of each network element in a vBRAS architecture according to an embodiment of this application.

In an architecture of the vBRAS shown in FIG. 1, to implement configuration delivery and configuration consistency verification performed by the vBRAS-CP on the vBRAS-UP by using the Netconf technology, refer to FIG. 2. The vBRAS-CP may be divided based on logical functions, and may include the following modules/components: a configuration module, a southbound interface manage agent (SIMA) module, a CP Netconf module, and a facilities management (FM) module. The vBRAS-UP may include but is not limited to a UP Netconf module.

The following describes functions of the modules in the vBRAS-CP.

The configuration module, CPcfg for short, is configured to receive configuration information in the service system/network management system 101, and store and configure a configuration parameter group in the configuration information. The SIMA module, also referred to as a CP Netconfc module, is mainly configured to complete packet encapsulation, Netconf session establishment, and RPC packet sending and termination. Specifically, the SIMA module is configured to deliver the configuration parameter group to the remote vBRAS-UP, obtain a configuration result of the vBRAS-UP, and determine, based on the configuration result, whether the configuration parameter group takes effect. The CP Netconf module is configured to perform packet processing of the vBRAS-CP. The FM module is configured to be responsible for functions such as management, parsing, and maintenance of an operation log.

The UP Netconf module in the vBRAS-UP is mainly responsible for functions such as packet processing, parameter configuration, and configuration result feedback.

The following describes functions of the modules shown in FIG. 2 in detail with reference to a configuration delivery process and a configuration consistency verification process.

Figure 3A:
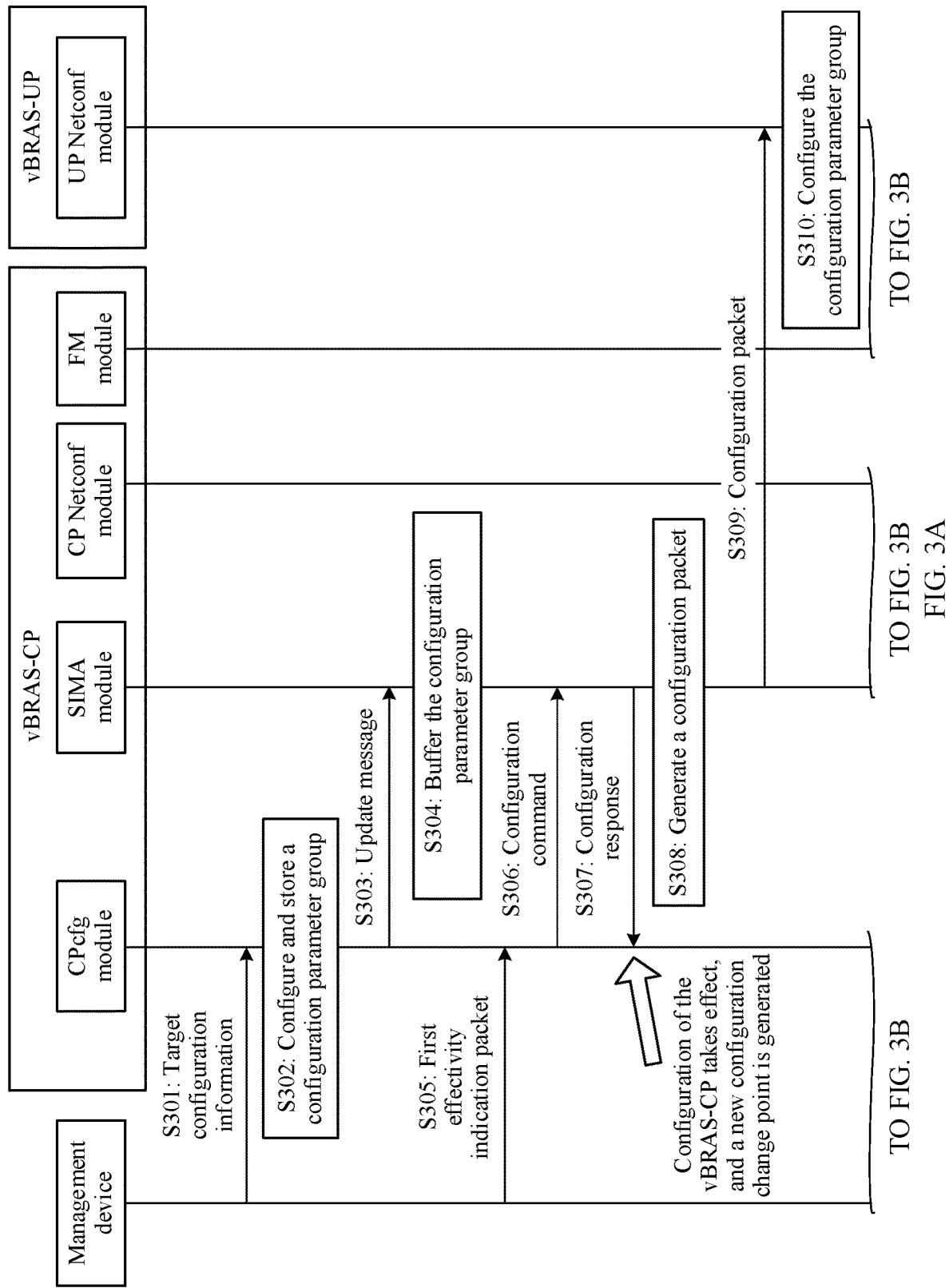
FIG. 3A and FIG. 3B are a flowchart of a conventional configuration delivery process.
Figure 3B:
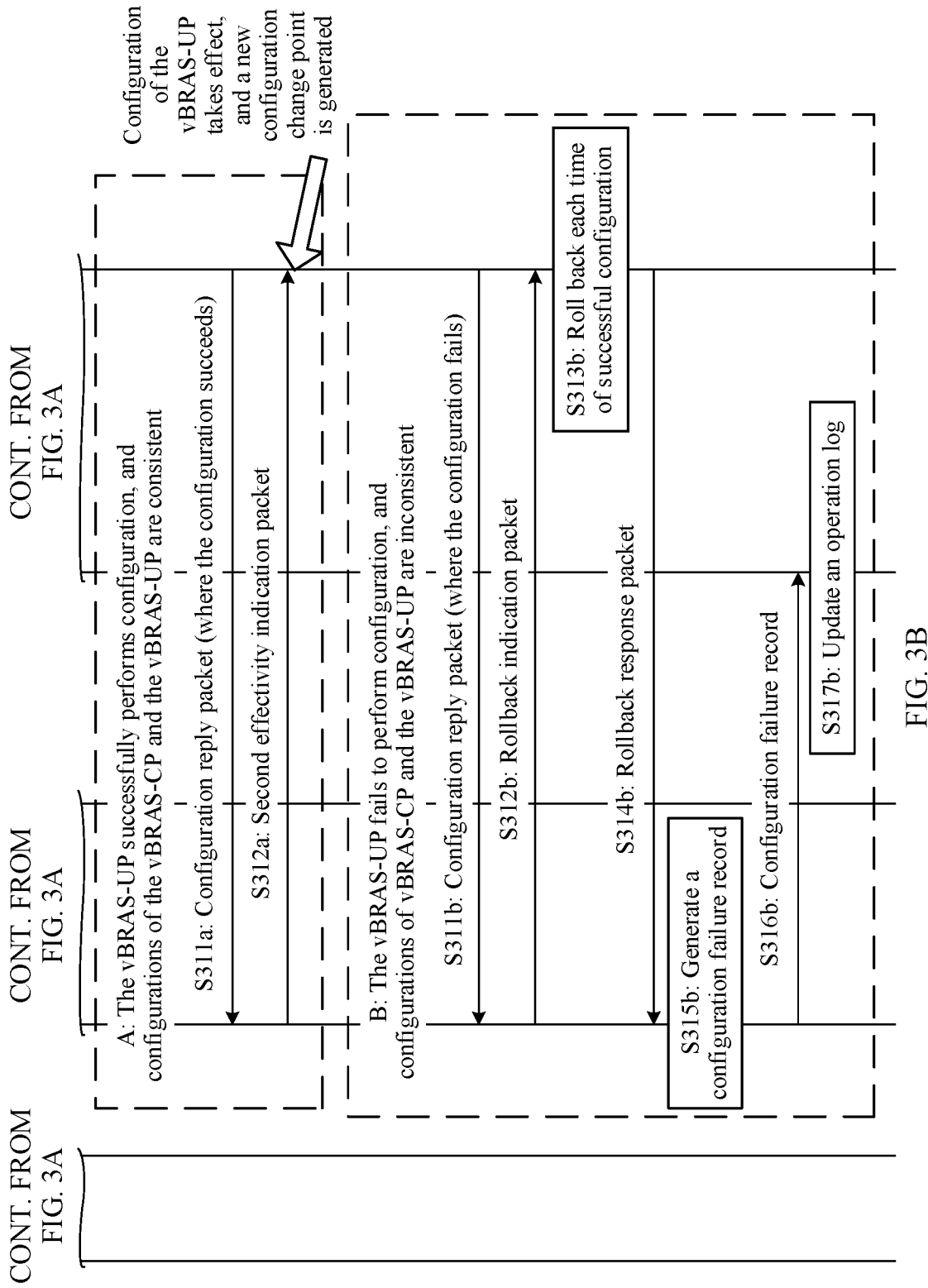

Refer to FIG. 3A and FIG. 3B. A conventional configuration delivery process performed by a vBRAS-CP on a vBRAS-UP may include the following steps.

S301: A management device sends target configuration information to the vBRAS-CP, where the target configuration information includes at least one configuration parameter group, and each configuration parameter group belongs to one service.

Optionally, the management device may be any management device in the service system/network management system 101 in the communication system shown in FIG. 1. For example, the management device may be the EMS.

S302: After receiving the target configuration information, a CPcfg module in the vBRAS-CP performs configuration based on the at least one configuration parameter group in the target configuration information, and stores the at least one configuration parameter group.

S303: When a SIMA module in the vBRAS-CP subscribes to configuration data, the CPcfg module sends an update message to the SIMA module, where the update message carries the at least one configuration parameter group.

The SIMA module may subscribe to the configuration data by using a data application model (DAM) component. The DAM component can define the at least one configuration parameter group that needs to be delivered. In this case, the at least one configuration parameter group is defined as DAM data. Therefore, the update message may carry the DAM data.

S304: After receiving the update message, the SIMA module stores/buffers the at least one configuration parameter group (the DAM data) carried in the update message.

S305: The management device sends a first effectivity indication packet (a commit packet) to the vBRAS-CP, to indicate that the target configuration information configured for the vBRAS-CP this time takes effect.

S306: The CPcfg module sends a configuration command to the SIMA module based on the first effectivity indication packet. Optionally, the configuration command may be sent via a notification (information, info) message.

S307: After receiving the configuration command, the SIMA module returns a configuration response to the CPcfg module. Optionally, the configuration response may be sent via a distribute trans-no message.

The SIMA module may determine, based on the configuration command, that the at least one configuration parameter group configured this time takes effect, and may perform the configuration delivery process on the vBRAS-UP.

In this case, after the CPcfg module receives the configuration response, that is, this time of configuration of the vBRAS-CP takes effect, a new vBRAS-CP configuration change point is generated.

S308: The SIMA module generates a configuration packet based on the at least one buffered configuration parameter group, where the configuration packet includes the at least one configuration parameter group.

Optionally, the configuration packet may be an RPC packet. A type of the RPC packet may be an edit-config type.

S309: The SIMA module sends the configuration packet to the vBRAS-UP.

S310: A UP Netconf module in the vBRAS-UP configures the at least one configuration parameter group in the configuration packet.

When the vBRAS-UP successfully performs configuration (Case A), the vBRAS-UP and the vBRAS-CP perform S311a and S312a. When the vBRAS-UP successfully performs configuration (Case B), the vBRAS-UP and the vBRAS-CP perform S311b to S317b.

The following describes the steps in Case A.

S311a: The UP Netconf module in the vBRAS-UP successfully configures all of the at least one configuration parameter group, and sends, to the SIMA module in the vBRAS-CP, a configuration reply packet indicating that the configuration succeeds.

S312a: After receiving the configuration reply packet, the SIMA module sends a second effectivity indication packet (a commit packet) to the vBRAS-UP, to indicate that the at least one configuration parameter group configured for the vBRAS-UP this time takes effect.

After receiving the second effectivity indication packet, the UP Netconf module in the vBRAS-UP determines that the at least one configuration parameter group configured this time takes effect.

In this case, after the UP Netconf module receives the second effectivity indication packet, that is, this time of configuration of the vBRAS-UP takes effect, a new vBRAS-UP configuration change point is generated.

The following describes the steps in Case A.

S311b: If the UP Netconf module in the vBRAS-UP fails to configure any one of the at least one configuration parameter group, the UP Netconf module in the vBRAS-UP sends, to the SIMA module in the vBRAS-CP, a configuration reply packet indicating that the configuration fails.

When the configuration packet is the RPC packet, the configuration reply packet is an RPC-reply packet. Configuration error information may be RPC-error information.

When failing to configure a configuration parameter group, the UP Netconf module generates configuration error information indicating that the configuration parameter group fails. Optionally, the configuration reply packet may carry, based on a maximum volume of carried data, a small quantity of pieces of configuration error information that is generated first. For example, when the maximum volume of data carried by the configuration reply packet is 30K, the configuration reply packet can carry a maximum of 30 to 50 pieces of configuration error information.

S312b: After receiving the configuration reply packet, the SIMA module sends a rollback indication packet (a discard commit packet) to the vBRAS-UP, to indicate the vBRAS-UP to roll back to a previous configuration.

S313b: The UP Netconf module rolls back each time of successful configuration based on the rollback indication packet, to roll back to the previous configuration.

S314b: The UP Netconf module sends a rollback response packet (a discard commit response packet) to a CP Netconf module in the vBRAS-CP.

S315b: After receiving the configuration reply packet, the SIMA module may generate a configuration failure record based on the configuration error information carried in the configuration reply packet.

The configuration failure record indicates that a configuration parameter group of a service fails to be configured. The service is one of at least one service to which a configuration parameter group corresponding to at least one piece of configuration error information carried in the configuration reply packet belongs.

S316b: The SIMA module sends the configuration failure record to an FM module.

S317b: The FM module updates the configuration failure record, and stores an updated configuration failure record in a maintained operation log.

In this way, the vBRAS-CP may parse the configuration failure record in the operation log by using an APP script, to generate an alarm message. The alarm message is for alarming the configuration failure of the configuration parameter group of the service.

In an example, a format of the configuration failure record may be represented by using the following code:

Failed to configure access point. (User-name=[user-name], IP-address=[IP-address], Session-id=[session-id], UPId=[UPId], MsgID=[MsgID], packCount=[packCount], packSeq=[packSeq], app-name=[app-name], Operation=[operation], Reason=[reason]).

Key information in the foregoing configuration failure record includes a service name (app-name), an error cause (Reason), and the like.

A user may view alarm information of the vBRAS-UP by using a display south configuration conflict (display south configuration conflict) command. A format of the display south configuration conflict command may be represented by using the following code:

[~BASE_VNFC1]display south configuration conflict
UP-id: 1024
Conflict command: qos-profile 123
Conflict reason: The qos-profile 123 already exists.
Conflict time: 2020-04-13 09:22:00
View: system It should be noted that a quantity of alarm messages of the vBRAS-UP that are stored by the vBRAS-CP is less than or equal to a preset maximum quantity. For example, the maximum quantity may be 100, 200, or the like.

Figure 4:
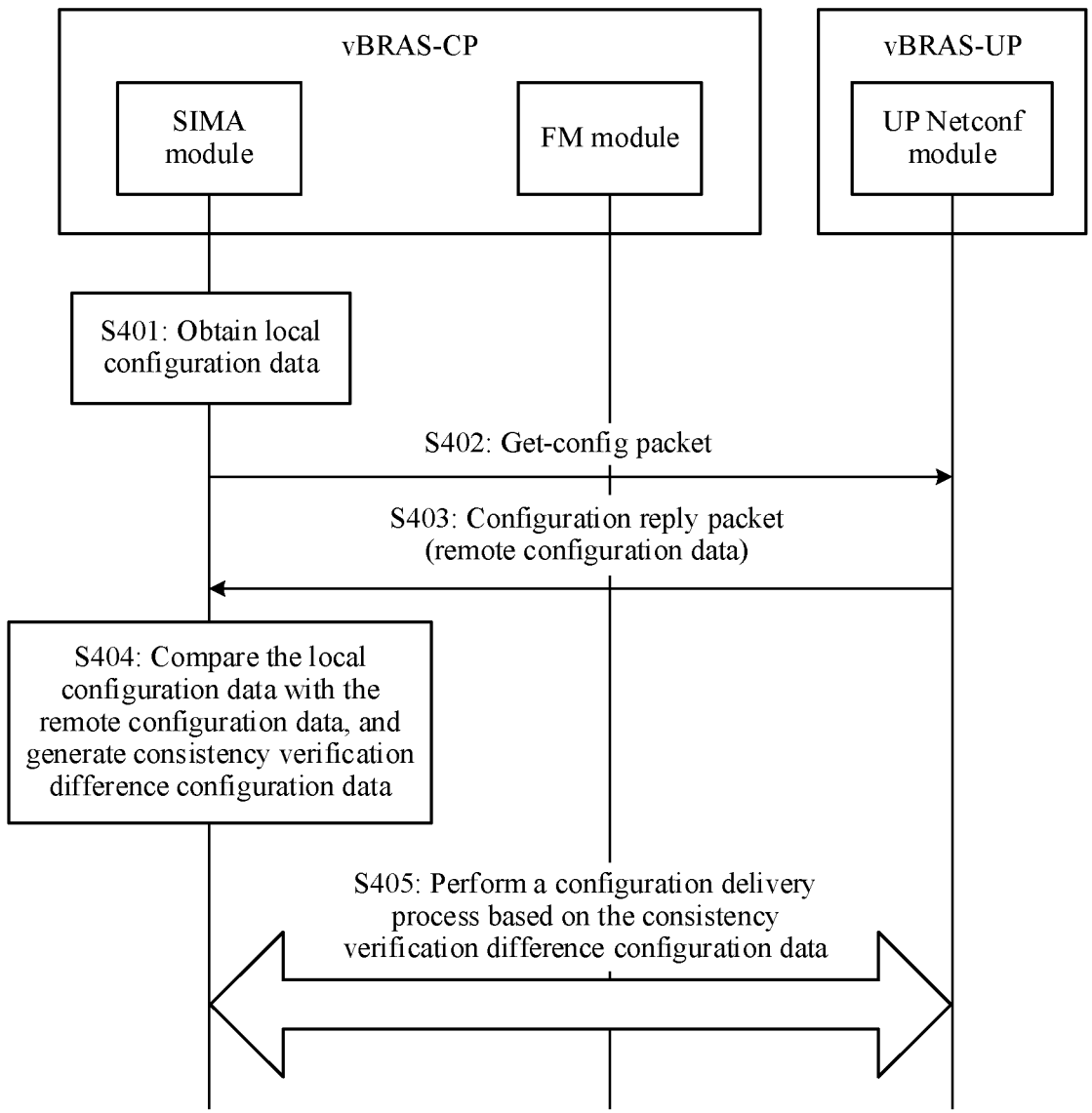
FIG. 4 is a flowchart of a conventional configuration consistency verification process.

Refer to FIG. 4. A conventional configuration consistency verification process performed by a vBRAS-CP on a vBRAS-UP may include the following steps.

S401: When the vBRAS-CP starts to process a consistency verification procedure, a SIMA module obtains local configuration data. The local configuration data may include configuration parameter groups that are of N services and that have been configured for the vBRAS-UP, where N is a positive integer. For example, N may be 3.

S402: The SIMA module sends a get-config packet to the vBRAS-UP, where the get-config packet carries indication information of the N services.

Optionally, the type of the get-config packet may be an extensible markup language (XML) packet.

S403: After receiving the get-config packet, a UP Netconf module in the vBRAS-UP obtains local configuration data of the N services based on the indication information of the N services in the get-config packet. Relative to the SIMA module, the local configuration data obtained by the UP Netconf module is remote configuration data. Therefore, the local configuration data is referred to as the remote configuration data subsequently in this embodiment of this application. The UP Netconf module sends a configuration reply packet to the vBRAS-CP, where the configuration reply packet includes the remote configuration data.

Optionally, the remote configuration data includes the configuration parameter groups that are of the N services and that have been configured for the vBRAS-UP.

S404: After obtaining the remote configuration data, the SIMA module compares the local configuration data with the remote configuration data, and generates consistency verification difference configuration data when the local configuration data and the remote configuration data are different, where at least one configuration parameter group included in the consistency verification difference configuration data is included in the local configuration data.

S405: The SIMA module performs a configuration delivery process based on the consistency verification difference configuration data. For the configuration delivery process, refer to S308 to S317*b* in the configuration delivery process shown in FIG. 3A and FIG. 3B. Details are not described herein again.

It can be learned from the configuration delivery process shown in FIG. 3A and FIG. 3B and the configuration consistency verification process shown in FIG. 4 that the vBRAS-CP performs configuration failure processes such as S315*b* to S317*b* based on the configuration error information reported by the vBRAS-UP by using the configuration reply packet. However, the vBRAS-UP can report, based only on the maximum volume of data carried by the configuration reply packet and generation time of the configuration error information, the small quantity of pieces of configuration error information that is generated first.

When the vBRAS-CP performs batch configuration, a large quantity of pieces of configuration error information may occur on the vBRAS-UP. However, limited by the foregoing configuration error information reporting manner, the vBRAS-UP can report only the small quantity of pieces of configuration error information that is generated first. Consequently, it is possible that a large quantity of pieces of key configuration error information (that is, configuration error information corresponding to configuration parameter groups of some key services) cannot be reported or are omitted. This causes great difficulty in searching for a root cause of a configuration error, locating a problem, and performing operations and maintenance.

Figure 5A:
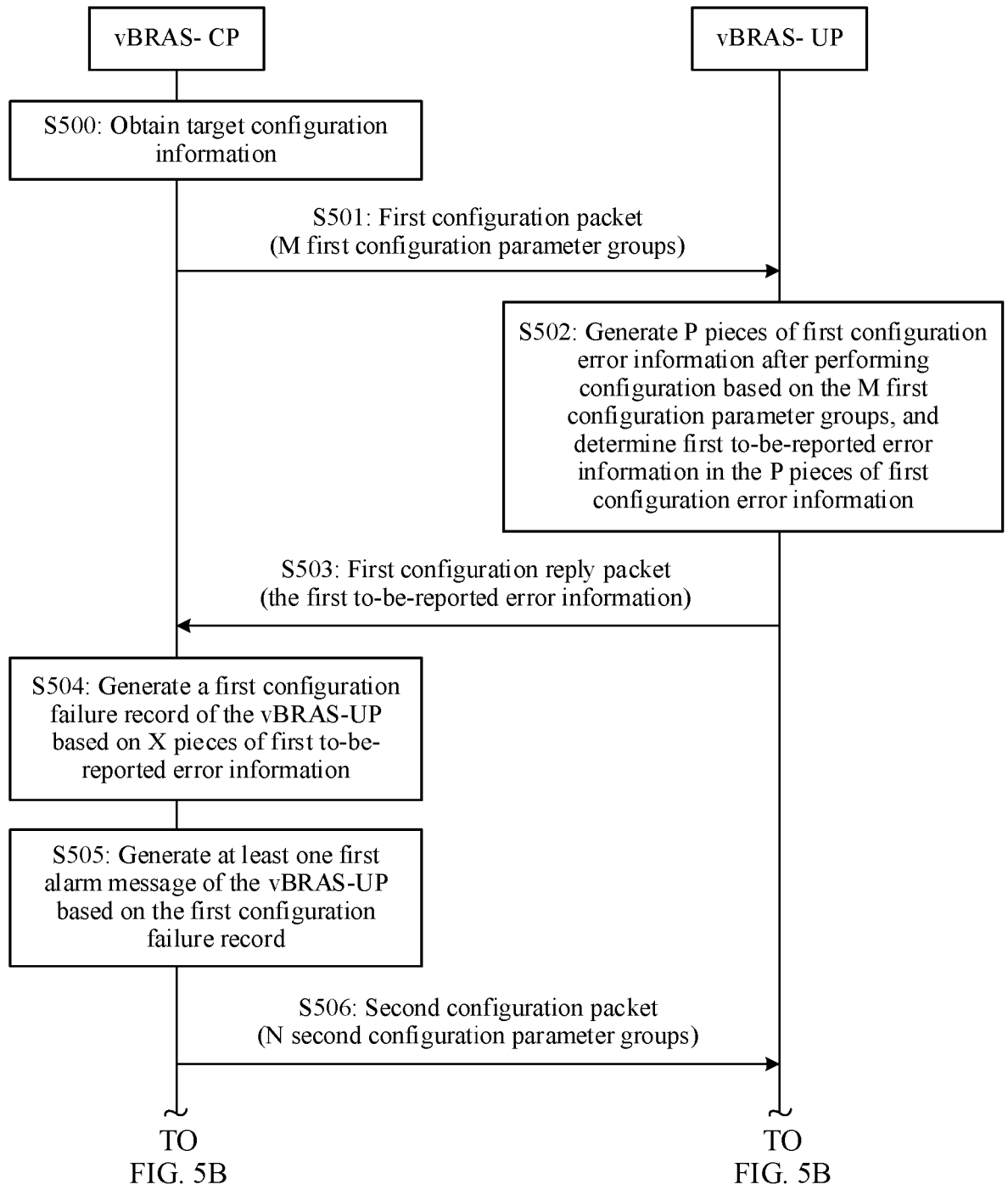
FIG. 5A and FIG. 5B are a flowchart of a configuration error information transmission method according to an embodiment of this application.
Figure 5B:
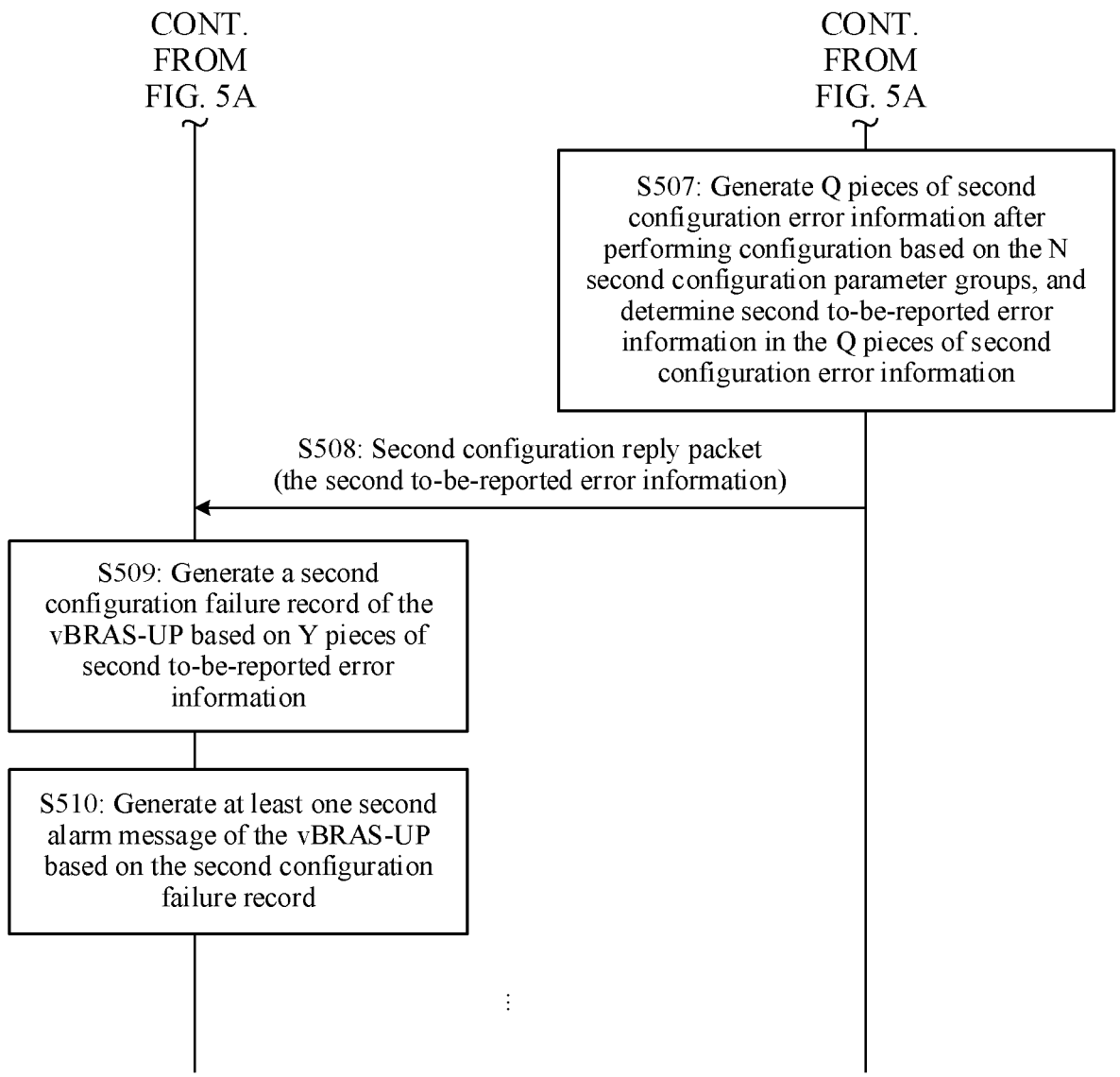

This application provides a configuration error information transmission method, to improve flexibility of reporting configuration error information by a vBRAS-UP to a vBRAS-CP. The method may be but is not limited to being applicable to the communication system shown in FIG. 1 and FIG. 2. Refer to FIG. 5A and FIG. 5B, a procedure of the method is described in detail below.

S500: The vBRAS-CP obtains target configuration information, where the target configuration information includes L configuration parameter groups, and L is a positive integer. Each configuration parameter group belongs to one service.

Optionally, the vBRAS-CP may obtain the target configuration information by using, but not limited to, the following methods.

Manner 1: The vBRAS-CP obtains the target configuration information sent by a management device. Optionally, the management device may be the management device, for example, the EMS, in the service system/network management system 101 shown in FIG. 1.

Manner 2: The vBRAS-CP obtains the target configuration information input by a user.

Manner 3: The vBRAS-CP obtains the target configuration information in a process of performing configuration consistency verification with the vBRAS-UP. In this manner, the target configuration information is consistency verification difference configuration data generated by the vBRAS-CP in the configuration consistency verification process.

In an implementation, after obtaining the target configuration information, the vBRAS-CP may deliver the L configuration parameter groups to the vBRAS-UP by using one configuration delivery procedure. That is, the vBRAS-CP delivers the L configuration parameter groups to the vBRAS-UP via a configuration packet.

In another implementation, after obtaining the target configuration information, the vBRAS-CP may split the L configuration parameter groups into a plurality of sets based on a quantity of the L configuration parameter groups or based on H services to which the L configuration parameter groups belong, and deliver each set to the vBRAS-UP by using a plurality of configuration delivery procedures. Different sets do not have a same configuration parameter group.

The vBRAS-UP feeds back a configuration reply packet to the vBRAS-CP in each configuration delivery procedure. In this way, compared with a manner in which the L configuration parameter groups are configured and delivered in a centralized manner, in this implementation, the vBRAS-UP may feed back the configuration reply packet for the configuration delivery procedure, to increase opportunities of reporting configuration error information by the vBRAS-UP and a quantity of pieces of the configuration error information reported by the vBRAS-UP, so that the vBRAS-CP obtains configuration error information as much as possible.

For example, when the quantity of the L configuration parameter groups is 1000, the vBRAS-CP may split the L configuration parameter groups into two sets: M first configuration parameter groups (where a quantity may be 500) and N second configuration parameter groups (where a quantity may be 500).

For another example, when the quantity of the L configuration parameter groups is 300, the vBRAS-CP may deliver the L configuration parameter groups to the vBRAS-UP by using one configuration delivery procedure.

For still another example, when the L configuration parameter groups belong to six services, the vBRAS-CP may split the L configuration parameter groups into two sets: M first configuration parameter groups (including configuration parameter groups belonging to three services) and N second configuration parameter groups (including configuration parameter groups belonging to the other three services).

For yet another example, when the L configuration parameter groups belong to two services, the vBRAS-CP may deliver the L configuration parameter groups to the vBRAS-UP by using one configuration delivery procedure.

S501: The vBRAS-CP sends a first configuration packet to the vBRAS-UP, where the first configuration packet includes the M first configuration parameter groups, and M is a positive integer. The vBRAS-UP receives the first configuration packet from the vBRAS-CP.

Optionally, when the vBRAS-CP determines to deliver the L configuration parameter groups to the vBRAS-UP by using one configuration delivery procedure, the M first configuration parameter groups are the L configuration parameter groups. When the vBRAS-CP determines to deliver the L configuration parameter groups to the vBRAS-UP by using a plurality of configuration delivery procedures, the M first configuration parameter groups belong to a part of the L configuration parameter groups.

S502: The vBRAS-UP generates P pieces of first configuration error information after performing configuration based on the M first configuration parameter groups, and the vBRAS-UP determines first to-be-reported error information in the P pieces of first configuration error information. Any piece of first configuration error information corresponds to one first configuration parameter group, and any piece of first configuration error information indicates that the vBRAS-UP fails to configure the first configuration parameter group corresponding to the first configuration error information. The first to-be-reported error information includes first configuration error information i, and does not include first configuration error information j, and a reporting priority of the first configuration error information i is higher than or equal to a reporting priority of the first configuration error information j.

In this embodiment of this application, the reporting priority of the first configuration error information i may be a reporting priority of a service to which a first configuration parameter group corresponding to the first configuration error information i belongs, and the reporting priority of the first configuration error information j may be a reporting priority of a service to which a first configuration parameter group corresponding to the first configuration error information j belongs.

In an implementation, the vBRAS-UP may determine the first first to-be-reported error information in the P pieces of first configuration error information by using the following steps.

A1: The vBRAS-UP determines a reporting priority of at least one service, where the at least one service includes a service to which at least one of the M first configuration parameter groups belongs. For example, the at least one service includes services to which the M first configuration parameter groups belong.

A2: The vBRAS-UP determines the first to-be-reported error information in the P pieces of first configuration error information based on the reporting priority of the at least one service.

It should be noted that first configuration parameter group corresponding to first configuration error information included in the first to-be-reported error information may belong to one or more services.

Optionally, the vBRAS-UP may perform step A2 by using the following step.

The vBRAS-UP determines the first to-be-reported error information in the P pieces of first configuration error information based on the reporting priority of the at least one service and a constraint condition.

In a design, the constraint condition is a constraint on a quantity of pieces of configuration error information that needs to be reported. For example, the constraint condition is that a quantity of pieces of the first to-be-reported error information is a target quantity.

In this design, the vBRAS-UP may specifically determine the first to-be-reported error information in the P pieces of first configuration error information based on the reporting priority of the at least one service and the constraint condition by using the following steps.

B1: The vBRAS-UP maintains a reporting record for each time of configuration delivery process, where the reporting record is for storing first configuration error information that needs to be reported.

B2: Then, the vBRAS-UP performs the following step for each or some of the P pieces of first configuration error information (the following uses only the first configuration error information i as an example for description).

The vBRAS-UP adds the first configuration error information i to the reporting record when a quantity of pieces of the first configuration error information in the reporting record is less than the target quantity; or when a quantity of pieces of the first configuration error information in the reporting record is equal to the target quantity, the vBRAS-UP determines that the reporting priority of the first configuration error information i is higher than a reporting priority of first configuration error information k in the reporting record, and the vBRAS-UP deletes the first configuration error information k in the reporting record, and adds the first configuration error information i to the reporting record.

B3: Finally, the vBRAS-UP determines that the first to-be-reported error information is first configuration error information that is included in the reporting record and that is of the target quantity.

Optionally, in this design, after generating each piece of first configuration error information, the vBRAS-UP may perform the foregoing steps on the first configuration error information; or the vBRAS-UP may sequentially perform the foregoing steps on each piece of first configuration error information after all the P pieces of first configuration error information are generated. This is not limited in this application.

Figure 6:
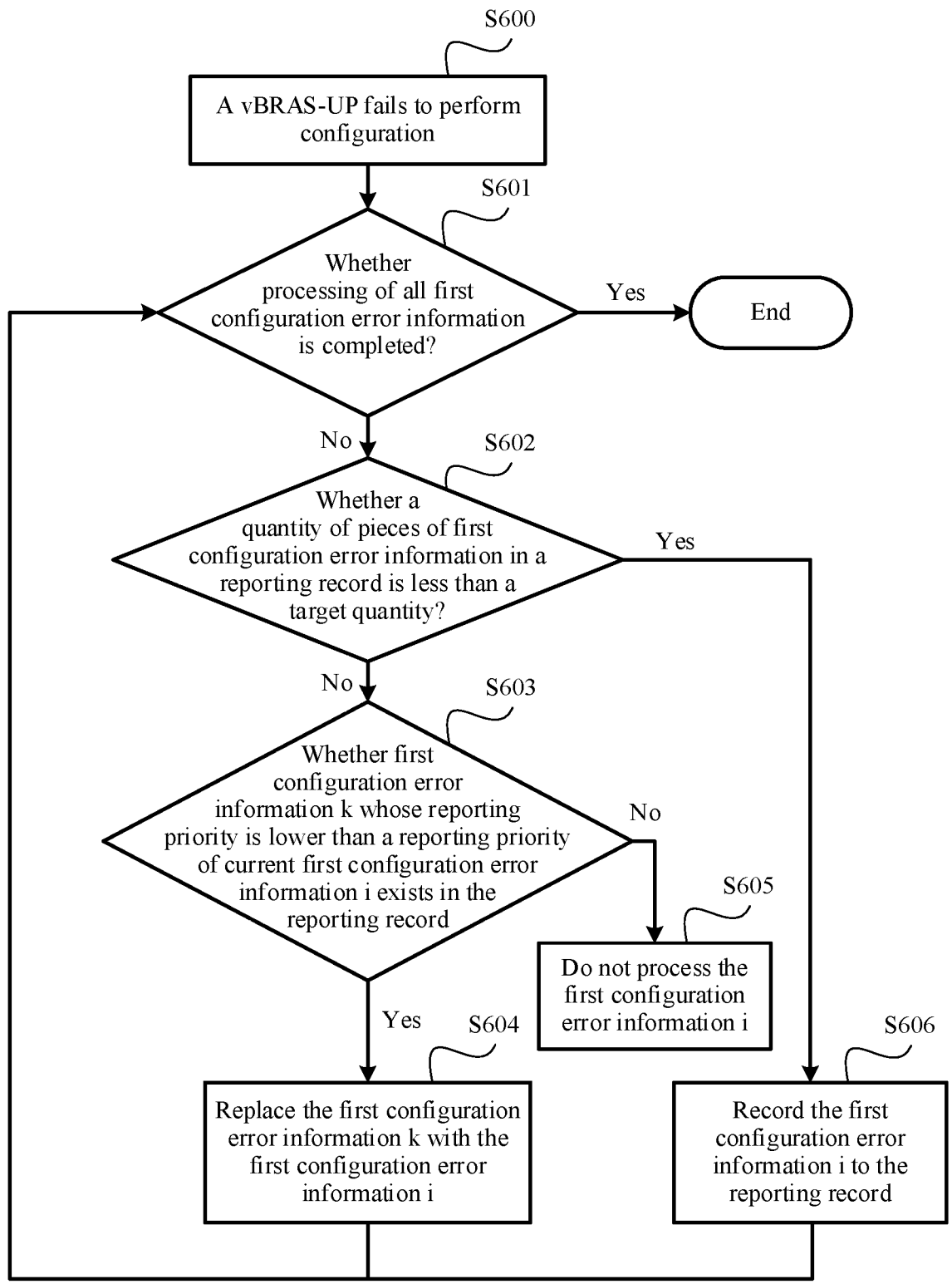
FIG. 6 is a flowchart of determining to-be-reported error information according to an embodiment of this application.

For example, the vBRAS-UP may determine the first to-be-reported error information by using a flowchart shown in FIG. 6. A specific process is as follows.

S600: The vBRAS-UP fails to configure the M first configuration parameter groups, and starts a procedure of determining the first to-be-reported error information.

S601: The vBRAS-UP determines whether processing of all first configuration error information is completed; and if yes, the procedure ends; otherwise, S602 is performed for the current first configuration error information i.

S602: The vBRAS-UP determines whether the quantity of pieces of the first configuration error information in the reporting record is less than the target quantity; and if yes, performs S606; otherwise, performs S603.

S603: The vBRAS-UP determines whether the first configuration error information k whose reporting priority is lower than the reporting priority of the current first configuration error information i exists in the reporting record; and if yes, performs S604; otherwise, performs S605.

When performing S603, the vBRAS-UP may compare a reporting priority of each piece of first configuration error information in the reporting record with the reporting priority of the first configuration error information i until the first configuration error information k is found or until the vBRAS-UP determines that the reporting priority of each first configuration error information in the reporting record is higher than or equal to the reporting priority of the first configuration error information i.

S604: When determining that the first configuration error information k exists, the vBRAS-UP replaces the first configuration error information k with the first configuration error information i. That is, the vBRAS-UP deletes the first configuration error information k in the reporting record, and adds the first configuration error information i to the reporting record.

S605: When determining that the first configuration error information k does not exist, the vBRAS-UP does not process the first configuration error information i.

S606: When determining that the quantity of pieces of the first configuration error information in the reporting record is less than the target quantity, the vBRAS-UP records (adds) the first configuration error information i to the reporting record.

As shown in FIG. 6, after performing step S604 or S606, the vBRAS-UP continues to perform S601 until the end.

In another design, the constraint condition is a constraint on a quantity of services that need to be reported. For example, the constraint condition is that a quantity of services to which a first configuration parameter group corresponding to the first to-be-reported error information belongs is a target quantity.

In this design, the vBRAS-UP may specifically determine the first to-be-reported error information in the P pieces of first configuration error information based on the reporting priority of the at least one service and the constraint condition by using the following steps.

C1: The vBRAS-UP determines G services to which first configuration parameter groups corresponding to the P pieces of first configuration error information belong, where G is a positive integer.

C2: The vBRAS-UP selects, from the G services based on the reporting priority of the at least one service, to-be-reported services with a highest reporting priority and of the target quantity.

C3: The vBRAS-UP selects, from the P pieces of first configuration error information, first configuration error information corresponding to a first configuration parameter group that belongs to the reporting services of the target quantity.

C4: The vBRAS-UP uses the selected first configuration error information as the first to-be-reported error information.

According to the foregoing two designs, the vBRAS-UP may select, from the P pieces of first configuration error information, first configuration error information having a higher reporting priority as the first to-be-reported error information for reporting. In this way, flexibility of reporting the configuration error information by the vBRAS-UP can be improved. In addition, the user or the vBRAS-CP may flexibly configure a reporting priority of a service, for example, increase a reporting priority of a key service, or decrease a reporting priority of a non-key service, to avoid that the vBRAS-UP omits or cannot report configuration error information for these key services when reporting configuration error information.

Optionally, in this embodiment of this application, the vBRAS-UP may perform step A1 in the following manners but not limited to the following manners.

Manner 1: The vBRAS-UP obtains a preset reporting priority of the at least one service. The reporting priority of the at least one service may be a preset default order. For example, services are sorted in descending order of reporting priorities as follows: aclcu, cusrvcomm, cuqos, cucgn, cusc, cuBr, brascuofa, brascuif, brascuagent, ethernetcuadp, brascuipv6, brascuipv4, mcastcuadp, cubraskeychain, cuussl, timerange.

Manner 2: The vBRAS-CP sends first priority configuration information to the vBRAS-UP; the vBRAS-UP obtains the first priority configuration information sent by the vBRAS-CP, where the first priority configuration information is for configuring the reporting priority of the at least one service; and the vBRAS-UP determines the reporting priority of the at least one service based on the first priority configuration information.

To avoid a problem that the default reporting priority order of the services in Manner 1 is inappropriate or does not satisfy a user requirement, this embodiment of this application provides Manner 2. For example, priority configuration command code included in the first priority configuration information is as follows:

[~CP10-diagnose]netconfc sync-config operation rpc-error priority [aclcu|cusrvcomm|cuqos|cucgn|cusc|cuBr|brascuofa|
brascuif|brascuagent|ethernetcuadp|brascuipv6|brascuipv4|
mcastcuadp|cubraskeychain|cuussl|timerange].

Manner 3: The vBRAS-CP sends second priority configuration information to the vBRAS-UP; the vBRAS-UP obtains the second priority configuration information sent by the vBRAS-CP, where the second priority configuration information is for configuring priorities of some services in the at least one service; and the vBRAS-UP determines the priorities of the some services based on the second priority configuration information, and the vBRAS-UP obtains preset reporting priorities of the other services in the at least one service; or the vBRAS-UP adaptively adjusts the reporting priorities of the other services in the at least one service based on the priorities of the some services.

To avoid a problem that a reporting priority order of all services configured in Manner 1 and Manner 2 is inappropriate or does not satisfy a user requirement, this embodiment of this application may further support specifying of the reporting priorities of the some services. For example, if each user cares about a qos service, the vBRAS-CP may adjust only a qos reporting priority to the highest by using the second priority configuration information. For example, priority configuration command code included in the second priority configuration information is as follows:

netconfc sync-config operation rpc-error priority qos.

The reporting priorities of the other services may be adaptively adjusted by using the following priority configuration command in a system view:

netconfc sync-config operation rpc-error priority auto.

For example, the first configuration parameter groups corresponding to the P pieces of first configuration error information generated by the vBRAS-UP belong to the following services: aclcu, cusrvcomm, cuqos, cucgn, cusc, cuBr, brascuofa, brascuif and brascuagent. If the vBRAS-CP specifies that a reporting priority of brascuif is higher than priorities of other services when configuring priorities of the foregoing service by using priority configuration information, the vBRAS-UP preferentially reports first configuration error information for the brascuif regardless of a quantity of pieces of first configuration error information generated for the other services and whether the first configuration error information is generated first.

S503: The vBRAS-UP sends a first configuration reply packet to the vBRAS-CP, where the first configuration reply packet includes the first to-be-reported error information. The vBRAS-CP receives the first configuration reply packet from the vBRAS-UP.

S504: The vBRAS-CP generates a first configuration failure record of the vBRAS-UP based on the first to-be-reported error information, where the first configuration failure record indicates that a first configuration parameter group of at least one target service fails to be configured.

In an implementation, the vBRAS-CP may generate the first configuration failure record in a conventional manner, for example, the configuration failure record generation method in S315b in the configuration delivery procedure shown in FIG. 3A and FIG. 3B.

In this case, even if the first configuration parameter group corresponding to the first configuration error information included in the first to-be-reported error information belongs to a plurality of services, the first configuration failure record only indicates that a first configuration parameter group of one target service in the plurality of services fails to be configured. In addition, in this case, a format of the first configuration failure record is the same as the format of the configuration failure record in the configuration delivery procedure shown in FIG. 3A and FIG. 3B, and mutual reference may be made.

In another implementation, the first configuration failure record can indicate that first configuration parameter groups of a plurality of target services fail to be configured. That is, when the first configuration parameter group corresponding to the first configuration error information included in the first to-be-reported error information belongs to a plurality of services, the first configuration failure record can indicate that the first configuration parameter groups of the plurality of services (that is, the plurality of target services) fail to be configured.

For example, a format of the first configuration failure record may be represented by using the following code:

Failed to configure access point. (User-name=[username], IP-address=[IP-address], Session-id=[session-id], UPId=[UPId], MsgID=[MsgID], packCount=[packCount], packSeq=[packSeq], app-name=[app-name1, app-name2, . . . ], Operation=[operation], Reason=[reason]).

As shown in the code, the app-name field may be filled with identifiers of a plurality of services simultaneously, to support the plurality of services. For example, app-name= [brascuif, aclcu].

According to this implementation, the vBRAS-CP may support recording of a plurality of services in one configuration failure record, so that a plurality of alarm messages can be generated subsequently based on the configuration failure record. In this way, a quantity of pieces of alarm information may be enriched, to facilitate searching for a root cause of a configuration error, locating a problem, and performing operations and maintenance based on the richer alarm information subsequently.

S505: The vBRAS-CP generates at least one first alarm message of the vBRAS-UP based on the first configuration failure record.

Corresponding to S504, when the first configuration failure record records one target service, the vBRAS-CP generates one first alarm message, where the first alarm message is for alarming a configuration failure of a configuration parameter group of the target service. When the first configuration failure record records a plurality of target services such as a first service and a second service, the vBRAS-CP generates two first alarm messages, where one of the two first alarm messages is for alarming a configuration failure of a configuration parameter group of the first service, and the other first alarm message is for alarming a configuration failure of a configuration parameter group of the second service.

It can be learned from the foregoing descriptions that a larger quantity of alarm messages generated by the vBRAS-CP about the vBRAS-UP is more helpful for the user to search for a root cause of a configuration error, locate a problem, and perform operations and maintenance by using these alarm messages. However, a quantity of alarm messages of one vBRAS-UP that are stored by the vBRAS-CP is usually limited. That is, the quantity of alarm messages of the vBRAS-UP that are stored by the vBRAS-CP is less than or equal to a preset maximum quantity. For example, the maximum quantity may be 100, 200, or the like.

Therefore, to enable a quantity of alarm messages generated by the vBRAS-CP in each configuration delivery process to be as close as possible to the maximum quantity, in an implementation, the target quantity in the constraint condition in step S502 may be determined based on the maximum quantity of alarm messages that are of the vBRAS-UP and that can be stored by the vBRAS-CP, or the target quantity is determined based on a maximum volume of data carried by the first configuration reply packet. This is not limited in this application.

When the target quantity is determined based on the maximum quantity of alarm messages that are of the vBRAS-CP and that can be stored by the vBRAS-CP, a value of the target data is close to or the same as that of the maximum quantity, and the value of the target quantity may be specifically set based on a specific scenario. For example, the target quantity may be greater than or equal to the maximum quantity.

In this implementation, the vBRAS-UP may report configuration error information to the vBRAS-CP as much as possible, so that the vBRAS-CP can generate alarm messages as much as possible.

It should be noted that the target quantity and/or the constraint condition may be preset, or may be determined by the vBRAS-CP and then configured for the vBRAS-UP.

When the vBRAS-CP determines to deliver the L configuration parameter groups in the target configuration information to the vBRAS-UP by using the plurality of configuration delivery procedures, the vBRAS-CP may separately send a plurality of configuration packets to the vBRAS-UP. The following uses the M first configuration parameter groups and the N second configuration parameter groups determined by the vBRAS-CP in the L configuration parameter groups as an example for description. The vBRAS-CP may further perform another configuration delivery procedure by using S506 to S510. It should be noted that execution time of the two configuration delivery procedures is not limited in this application. The two configuration delivery procedures may be performed simultaneously, may partially overlap in terms of time, or may not overlap in terms of time.

S506: The vBRAS-CP sends a second configuration packet to the vBRAS-UP, where the second configuration packet includes the N second configuration parameter groups, and N is a positive integer. The vBRAS-UP receives the second configuration packet from the vBRAS-CP.

S507: The vBRAS-UP generates Q pieces of second configuration error information after performing configuration based on the N second configuration parameter groups, and the vBRAS-UP determines second to-be-reported error information in the Q pieces of second configuration error information. Any piece of second configuration error information corresponds to one second configuration parameter group, and the any piece of second configuration error information indicates that the vBRAS-UP fails to configure the second configuration parameter group corresponding to the second configuration error information.

Optionally, the vBRAS-UP may determine the second to-be-reported error information by using a method the same as that in S502 for determining the first to-be-reported error information. For a specific process, refer to the descriptions in S502. Details are not described herein again.

S508: The vBRAS-UP sends a second configuration reply packet to the vBRAS-CP, where the second configuration reply packet includes the second to-be-reported error information. The vBRAS-CP receives the second configuration reply packet from the vBRAS-UP.

S509: The vBRAS-CP generates a second configuration failure record of the vBRAS-UP based on the second to-be-reported error information, where the second configuration failure record indicates that a second configuration parameter group of at least one target service fails to be configured.

S510: The vBRAS-CP generates at least one second alarm message of the vBRAS-UP based on the second configuration failure record.

For a process of performing S509 and S510 by the vBRAS-CP, refer to the descriptions in S504 and S505. Details are not described herein again.

It should be further noted that, in this embodiment of this application, the vBRAS-CP may implement the foregoing steps by using the CPcfg module, the SIMA module, the CP Netconf module, and the FM module in FIG. 2. For details, refer to the foregoing descriptions of FIG. 3A, FIG. 3B, and FIG. 4. The vBRAS-UP may implement the foregoing steps by using the UP Netconf module in FIG. 2. For related steps, also refer to the foregoing descriptions of FIG. 3A, FIG. 3B, and FIG. 4.

This embodiment of this application provides the configuration error information transmission method. In the method, when generating a plurality of pieces of configuration error information after configuring a batch of configuration parameter groups, the vBRAS-UP may report the configuration error information to the vBRAS-CP based on reporting priorities of the configuration error information. In a conventional method, the vBRAS-UP can report only configuration error information that is generated first. In comparison, in this method, reporting can be performed based on the reporting priorities of the configuration error information. In this way, the user or the vBRAS-CP can configure, by configuring the reporting priorities, an order of precedence of the configuration error information to be reported by the vBRAS-UP, so that flexibility of reporting the configuration error information by the vBRAS-UP to the vBRAS-CP is improved, and efficiency of searching for the root cause of the configuration error, locating the problem, and performing operations and maintenance by the vBRAS-CP can be improved.

Figure 7:
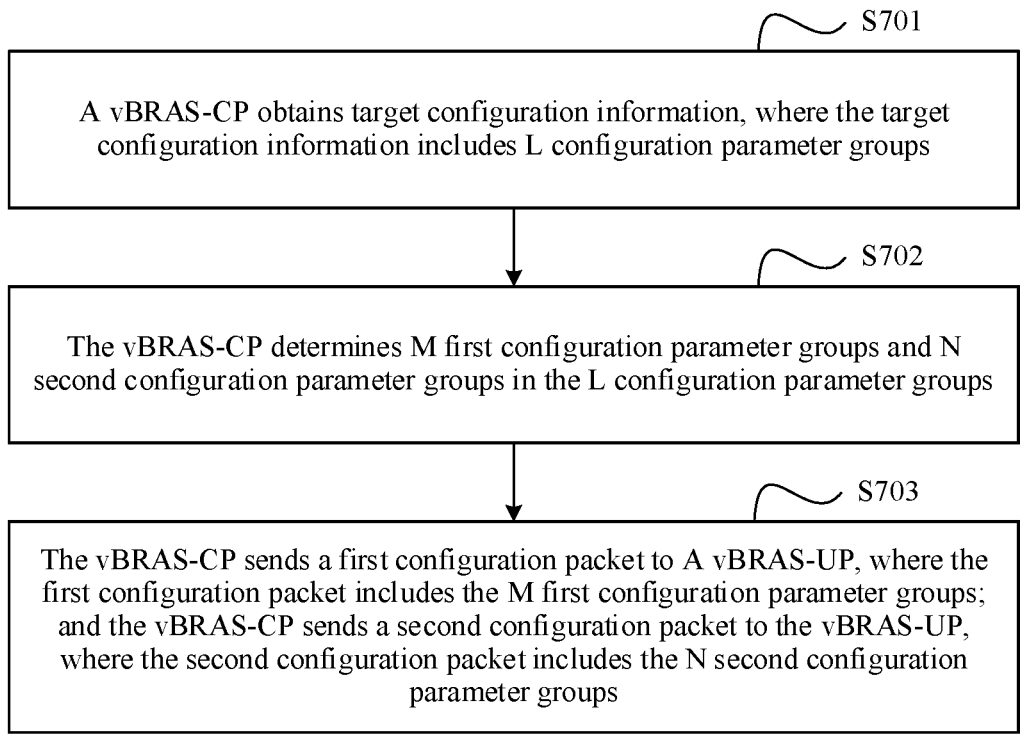
FIG. 7 is a flowchart of a configuration method according to an embodiment of this application.

This application further provides a configuration method. The method may be but is not limited to being applicable to the communication system shown in FIG. 1 and FIG. 2. Refer to FIG. 7, a procedure of the method is described in detail below.

S701: A vBRAS-CP obtains target configuration information, where the target configuration information includes L configuration parameter groups, and L is a positive integer. Each configuration parameter group belongs to one service.

Optionally, the vBRAS-CP may obtain the target configuration information in the three manners provided in S500 in the embodiment shown in FIG. 5A and FIG. 5B but not limited to the three manners. For a specific process, refer to the descriptions in S500. Details are not described herein again.

In this embodiment of this application, after obtaining the target configuration information, the vBRAS-CP may split the L configuration parameter groups into a plurality of sets based on a quantity of the L configuration parameter groups or a quantity of H services to which the L configuration parameter groups belong, and separately deliver the plurality of sets to a vBRAS-UP by using a plurality of configuration delivery procedures. Different sets do not have a same configuration parameter group.

In this embodiment of this application, M first configuration parameter groups and N second configuration parameter groups determined by the vBRAS-CP in the L configuration parameter groups are used as an example for description.

S702: The vBRAS-CP determines the M first configuration parameter groups and the N second configuration parameter groups in the L configuration parameter groups.

S703: The vBRAS-CP sends a first configuration packet to the vBRAS-UP, where the first configuration packet includes the M first configuration parameter groups; and the vBRAS-CP sends a second configuration packet to the vBRAS-UP, where the second configuration packet includes the N second configuration parameter groups.

For a process of performing S703 by the vBRAS-CP, refer to the descriptions in S501 and S506 in the embodiment shown in FIG. 5A and FIG. 5B. Details are not described herein again. In addition, for processing processes after the vBRAS-UP receives the first configuration packet and the second configuration packet, also refer to the descriptions in the embodiment in FIG. 5A and FIG. 5B or the descriptions in the procedure shown in FIG. 3A and FIG. 3B or FIG. 4. Details are not described herein again.

This embodiment of this application provides the configuration method. In the configuration method, the vBRAS-CP may split the L configuration parameter groups configured once into the plurality of sets, and separately deliver the plurality of sets to the vBRAS-UP by using the plurality of configuration delivery procedures. The vBRAS-UP feeds back a configuration reply packet to the vBRAS-CP in each configuration delivery procedure. In this way, compared with a conventional manner in which the L configuration parameter groups are configured and delivered in a centralized manner, according to the method, the vBRAS-UP may feed back the configuration reply packet for the configuration delivery procedure, to increase opportunities of reporting configuration error information by the vBRAS-UP and a quantity of pieces of the configuration error information reported by the vBRAS-UP in a configuration process this time, so that the vBRAS-CP obtains configuration error information as much as possible.

This application further provides a configuration failure record generation method. The method may be but is not limited to being applicable to the communication system shown in FIG. 1 and FIG. 2. In the method, after receiving a configuration reply packet from a vBRAS-UP, a vBRAS-CP may generate a configuration failure record of the vBRAS-UP based on to-be-reported error information included in the configuration reply packet. The configuration failure record indicates that a configuration parameter group of at least one target service fails to be configured, and the at least one target service is a service to which a configuration parameter group corresponding to configuration error information included in the to-be-reported error information belongs.

In this embodiment of this application, for a format of the configuration failure record, refer to the format of the first configuration failure record in the embodiment shown in FIG. 5A and FIG. 5B. Details are not described herein again. The configuration failure record can record identifiers of a plurality of services.

According to this embodiment, the vBRAS-CP may support recording of a plurality of services in one configuration failure record, so that a plurality of alarm messages can be generated subsequently based on the configuration failure record. In this way, a quantity of pieces of alarm information may be enriched, to facilitate searching for a root cause of a configuration error, locating a problem, and performing operations and maintenance based on the richer alarm information subsequently.

This application further provides a service priority configuration method. The method may be but is not limited to being applicable to the communication system shown in FIG. 1 and FIG. 2. In this method, a vBRAS-CP sends priority configuration information to a vBRAS-UP. The priority configuration information may be for configuring a reporting priority of at least one service. Alternatively, the vBRAS-UP stores a preset reporting priority of at least one service. The vBRAS-UP adaptively adjusts a reporting priority of another service based on the priority of the at least one service configured in the priority configuration information.

For example, the priority configuration information may include reporting priorities of all services. In this case, priority configuration command code in the priority configuration information is as follows:

[~CP10-diagnose]netconfc sync-config operation rpc-error priority [aclcu|cusrvcomm|cuqos|cucgn|cusc|cuBr|brascuofa|
brascuif|brascuagent|ethernetcuadp|brascuipv6|brascuipv4|
mcastcuadp|cubraskeychain|cuussl|timerange].

For example, the priority configuration information may include reporting priorities of some services. In this case, priority configuration command code in the priority configuration information is as follows:

netconfc sync-config operation rpc-error priority qos.

For example, the vBRAS-UP may adaptively adjust a reporting priority of another service by using the following priority configuration command:

netconfc sync-config operation rpc-error priority auto.

According to this embodiment of this application, the vBRAS-UP may determine a reporting priority of a service. In this way, in a configuration delivery process, if the vBRAS-UP generates a large quantity of pieces of configuration error information, the vBRAS-UP may choose, based on the reporting priority of the service, to report, to the vBRAS-CP, configuration error information corresponding to a configuration parameter group of a service having a higher reporting priority, so that flexibility of reporting the configuration error information by the vBRAS-UP can be improved. In addition, a user or the vBRAS-CP may flexibly configure the reporting priority of the service, for example, increase a reporting priority of a key service, or decrease a reporting priority of a non-key service, to avoid that the vBRAS-UP omits or cannot report configuration error information for these key services when reporting configuration error information.

This application further provides a configuration error information transmission method. The method may be but is not limited to being applicable to the communication system shown in FIG. 1 and FIG. 2. In this method, in a configuration delivery process, if a vBRAS-UP generates a large quantity of pieces of configuration error information, the vBRAS-UP selects to-be-reported error information from the large quantity of pieces of configuration error information based on a constraint condition.

In an implementation, the constraint condition is that a quantity of pieces of the to-be-reported error information is a target quantity. In another implementation, the constraint condition is that a quantity of services to which a configuration parameter group corresponding to the to-be-reported error information belongs is a target quantity.

The target quantity is determined based on a maximum quantity of alarm messages of the vBRAS-UP that can be stored by a vBRAS-CP. A value of the target data is close to or the same as that of the maximum quantity, and the value of the target quantity may be specifically set based on a specific scenario. For example, the target quantity may be greater than or equal to the maximum quantity.

Compared with a conventional configuration error information reporting manner, according to this method, the vBRAS-UP may report configuration error information to the vBRAS-CP as much as possible, so that the vBRAS-CP can generate alarm messages as much as possible.

Figure 8:
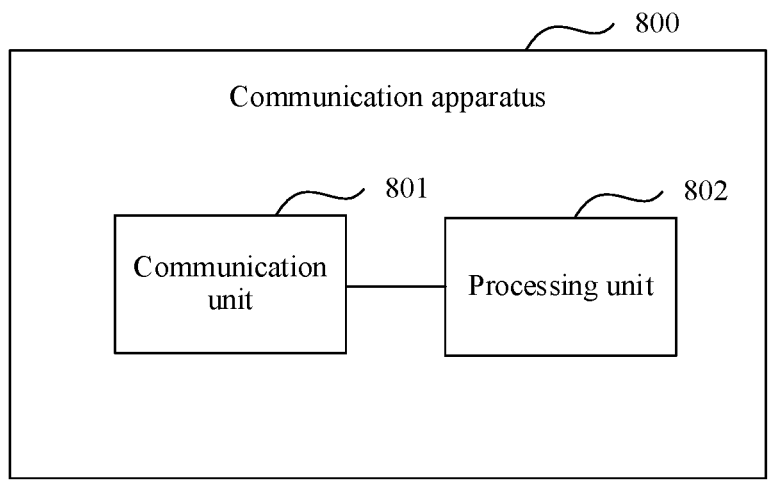
FIG. 8 is a diagram of a structure of a communication apparatus according to an embodiment of this application.

Based on a same technical concept, this application further provides a communication apparatus. A structure of the apparatus is shown in FIG. 8, and includes a communication unit 801 and a processing unit 802. The communication apparatus 800 may be used in the user plane network element (the vBRAS-UP) or the control plane network element (the vBRAS-CP) in the communication system shown in FIG. 1 and FIG. 2, and may implement the methods provided in the foregoing embodiments. The following describes functions of the units in the apparatus 800.

The communication unit 801 is configured to receive and send data. In an implementation, the communication unit 801 may be implemented by using a physical interface, a communication module, a communication interface, or an input/output interface. The communication apparatus 800 may be connected to a network cable or a cable by using the communication unit 801, to establish a physical connection to another device.

The following describes functions of the processing unit 802 that correspond when the communication apparatus 800 is used in the user plane network element (for example, the communication apparatus 800 may perform the steps performed by the user plane network element in FIG. 5A to FIG. 7).

The processing unit 802 is configured to:

receive a first configuration packet from a control plane network element by using the communication unit 801, where the first configuration packet carries a plurality of configuration parameter groups, and any one of the plurality of configuration parameter groups belongs to one service;

generate a plurality of pieces of configuration error information after performing configuration based on the plurality of configuration parameter groups, where any piece of configuration error information corresponds to one configuration parameter group, and the any piece of configuration error information indicates that the processing unit 802 fails to configure the configuration parameter group corresponding to the configuration error information; and send, to the control plane network element by using the communication unit 8oi, a first configuration reply packet including to-be-reported error information, where the to-be-reported error information includes first configuration error information in the plurality of pieces of configuration error information, the to-be-reported error information does not include second configuration error information in the plurality of pieces of configuration error information, and a reporting priority of the first configuration error information is higher than or equal to a reporting priority of the second configuration error information.

In an implementation, the reporting priority of the first configuration error information is a reporting priority of a service to which a configuration parameter group corresponding to the first configuration error information belongs, and the reporting priority of the second configuration error information is a reporting priority of a service to which a configuration parameter group corresponding to the second configuration error information belongs.

In an implementation, the processing unit 802 is further configured to:

determine a reporting priority of at least one service before sending, to the control plane network element by using the communication unit 8oi, the first configuration reply packet including the to-be-reported error information, where the at least one service includes a service to which at least one of the plurality of configuration parameter groups belongs; and determine the to-be-reported error information in the plurality of pieces of configuration error information based on the reporting priority of the at least one service.

In an implementation, when determining the to-be-reported error information in the plurality of pieces of configuration error information based on the reporting priority of the at least one service, the processing unit 802 is specifically configured to:

determine the to-be-reported error information in the plurality of pieces of configuration error information based on the reporting priority of the at least one service and a constraint condition, where the constraint condition is that a quantity of pieces of the to-be-reported error information is a target quantity; or the constraint condition is that a quantity of services to which a configuration parameter group corresponding to the to-be-reported error information belongs is a target quantity.

In an implementation, when the constraint condition is that the quantity of pieces of the to-be-reported error information is the target quantity, and when determining the to-be-reported error information in the plurality of pieces of configuration error information based on the reporting priority of the at least one service and the constraint condition, the processing unit 802 is specifically configured to:

add the first configuration error information to a reporting record when a quantity of pieces of configuration error information in the reporting record is less than the target quantity; or when a quantity of pieces of configuration error information in a reporting record is equal to the target quantity, determine that the reporting priority of the first configuration error information is higher than a reporting priority of third configuration error information in the reporting record, delete the third configuration error information in the reporting record, and add the first configuration error information to the reporting record; and determine that the to-be-reported error information is the configuration error information included in the reporting record.

In an implementation, the target quantity is determined based on a maximum quantity of alarm messages of the user plane network element that can be stored by the control plane network element, and the alarm message is generated by the control plane network element based on the to-be-reported error information reported by the user plane network element; or the target quantity is determined based on a maximum volume of data carried by the first configuration reply packet.

In an implementation, when the target quantity is determined based on the maximum quantity of alarm messages of the user plane network element that can be stored by the control plane network element, the target quantity is greater than or equal to the maximum quantity.

In an implementation, when determining the reporting priority of the at least one service, the processing unit 802 is specifically configured to:

obtain a preset reporting priority of the at least one service; obtain first priority configuration information sent by the control plane network element, where the first priority configuration information is for configuring the reporting priority of the at least one service; and determine the reporting priority of the at least one service based on the first priority configuration information; or obtain second priority configuration information sent by the control plane network element, where the second priority configuration information is for configuring a priority of a first service in the at least one service; determine the priority of the first service based on the second priority configuration information; and obtain a preset reporting priority of a second service in the at least one service, or adjust a reporting priority of a second service based on the priority of the first service.

In an implementation, the to-be-reported error information further includes fourth configuration error information in the plurality of pieces of configuration error information, and a service to which a configuration parameter group corresponding to the fourth configuration error information belongs is different from the service to which the configuration parameter group corresponding to the first configuration error information belongs.

In an implementation, the user plane network element is used in a communication system in which a control plane is separated from a user plane, the user plane network element is a user plane network element in the communication system, and the control plane network element is a control plane network element in the communication system.

The following describes functions of the processing unit 802 that correspond when the communication apparatus 800 is used in the control plane network element (for example, the communication apparatus 800 may perform the steps performed by the control plane network element in FIG. 5A to FIG. 7).

The processing unit 802 is configured to:

send a first configuration packet to a user plane network element by using the communication unit 801, where the first configuration packet carries a plurality of first configuration parameter groups, and any one of the plurality of first configuration parameter groups belongs to one service; and receive a first configuration reply packet from the user plane network element by using the communication unit 801, where the first configuration reply packet includes to-be-reported error information, the to-be-reported error information included in the first configuration reply packet includes first configuration error information, the to-be-reported error information included in the first configuration reply packet does not include second configuration error information, a reporting priority of the first configuration error information is higher than or equal to a reporting priority of the second configuration error information, and the first configuration error information is generated after the user plane network element performs configuration based on any one of the plurality of first configuration parameter groups.

In an implementation, the reporting priority of the first configuration error information is a reporting priority of a service to which a configuration parameter group corresponding to the first configuration error information belongs, and the reporting priority of the second configuration error information is a reporting priority of a service to which a configuration parameter group corresponding to the second configuration error information belongs.

In an implementation, a quantity of pieces of the to-be-reported error information is a target quantity; or a quantity of services to which a configuration parameter group corresponding to the to-be-reported error information belongs is a target quantity.

In an implementation, the target quantity is determined based on a maximum quantity of alarm messages of the user plane network element that can be stored by the control plane network element, and the alarm message is generated by the control plane network element based on the to-be-reported error information reported by the user plane network element; or the target quantity is determined based on a maximum volume of data carried by the first configuration reply packet.

In an implementation, when the target quantity is determined based on the maximum quantity of alarm messages of the user plane network element that can be stored by the control plane network element, the target quantity is greater than or equal to the maximum quantity.

In an implementation, the processing unit 802 is further configured to:

send priority configuration information to the user plane network element by using the communication unit 801, where the priority configuration information is for configuring a reporting priority of at least one service, and the at least one service includes a service to which at least one of the plurality of first configuration parameter groups belongs.

In an implementation, the processing unit 802 is further configured to:

generate a configuration failure record of the user plane network element based on first to-be-reported error information after receiving the first configuration reply packet from the user plane network element by using the communication unit 801; and generate at least one alarm message of the user plane network element based on the configuration failure record.

In an implementation, the first to-be-reported error information includes the first configuration error information and third configuration error information, where the configuration parameter group corresponding to the first configuration error information belongs to a first service, and a configuration parameter group corresponding to the third configuration error information belongs to a second service; and the configuration failure record indicates that the configuration parameter group of the first service and the configuration parameter group of the second service fail to be configured; and the at least one alarm message includes a first alarm message and a second alarm message, where the first alarm message is for alarming a configuration failure of the configuration parameter group of the first service, and the second alarm message is for alarming a configuration failure of the configuration parameter group of the second service.

In an implementation, the processing unit 802 is further configured to:

obtain target configuration information, where the target configuration information includes a plurality of configuration parameter groups;

determine the plurality of first configuration parameter groups and a plurality of second configuration parameter groups in the plurality of configuration parameter groups included in the target configuration information, where any one of the plurality of first configuration parameter groups is different from any one of the plurality of second configuration parameter groups;

send a second configuration packet to the user plane network element by using the communication unit 801, where the second configuration packet carries the plurality of second configuration parameter groups; and receive a second configuration reply packet from the user plane network element by using the communication unit 801, where the second configuration reply packet includes to-be-reported error information, and the to-be-reported error information included in the second configuration reply packet is generated after the user plane network element performs configuration based on at least one of the plurality of second configuration parameter groups.

In an implementation, when obtaining the target configuration information, the processing unit 802 is specifically configured to:

by using the communication unit 801, obtain the target configuration information sent by a management device; obtain the target configuration information input by a user; or obtain the target configuration information in a configuration consistency verification process of the control plane network element and the user plane network element.

In an implementation, the control plane network element is used in a communication system in which a control plane is separated from a user plane, the user plane network element is a user plane network element in the communication system, and the control plane network element is a control plane network element in the communication system.

It should be noted that, in the foregoing embodiment of this application, division into the modules is an example, is merely logical function division, and may be other division during actual implementation. In addition, function units in embodiments of this application may be integrated into one processing unit, may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions in this application essentially, the part contributing to the prior art, or all or some of the technical solutions may be implemented in the form of a software product. The computer software product is stored in a storage medium, and includes several instructions for instructing a computer device (which may be a personal computer, a server, a network device, or the like) or a processor to perform all or some of the steps of the methods in embodiments of this application. The foregoing storage medium includes: any medium that can store program code, for example, a USB flash drive, a removable hard disk, a read-only memory (ROM), a random access memory (RAM), a magnetic disk, or an optical disc.

Figure 9:
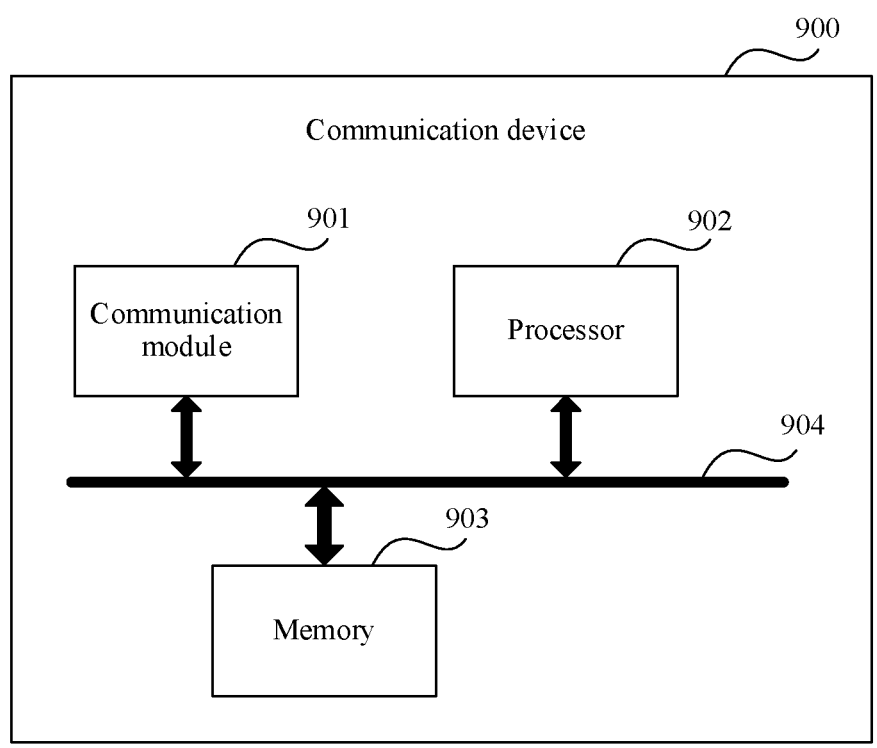
FIG. 9 is a diagram of a structure of a communication device according to an embodiment of this application.

Based on a same technical concept, this application further provides a communication device. The communication device may be used in the user plane network element (the vBRAS-UP) or the control plane network element (the vBRAS-CP) in the communication system shown in FIG. 1 or FIG. 2, may implement the methods provided in the foregoing embodiments, and has functions of the communication apparatus shown in FIG. 8. As shown in FIG. 9, the communication device 900 includes a communication module 901, a processor 902, and a memory 903. The communication module 901, the processor 902, and the memory 903 are connected to each other.

Optionally, the communication module 901, the processor 902, and the memory 903 are connected to each other through a bus 904. The bus 904 may be a peripheral component interconnect (PCI) bus, an extended industry standard architecture (EISA) bus, or the like. Buses may be classified into an address bus, a data bus, a control bus, and the like. For ease of representation, only one thick line is for representing the bus in FIG. 9, but this does not mean that there is only one bus or only one type of bus.

The communication module 901 is configured to receive and send data, to implement communication and interaction with another device. For example, the communication module 901 may be implemented by using a physical interface or a communication interface.

In an implementation, the communication device 900 is used in the user plane network element. For example, the communication device 900 may perform the steps performed by the user plane network element in FIG. 5A to FIG. 7. The processor 902 is specifically configured to:

receive a first configuration packet from a control plane network element by using the communication module 901, where the first configuration packet carries a plurality of configuration parameter groups, and any one of the plurality of configuration parameter groups belongs to one service;

generate a plurality of pieces of configuration error information after performing configuration based on the plurality of configuration parameter groups, where any piece of configuration error information corresponds to one configuration parameter group, and the any piece of configuration error information indicates that the processor 902 fails to configure the configuration parameter group corresponding to the configuration error information; and send, to the control plane network element by using the communication module 901, a first configuration reply packet including to-be-reported error information, where the to-be-reported error information includes first configuration error information in the plurality of pieces of configuration error information, the to-be-reported error information does not include second configuration error information in the plurality of pieces of configuration error information, and a reporting priority of the first configuration error information is higher than or equal to a reporting priority of the second configuration error information.

In an implementation, the communication device 900 is used in the control plane network element. For example, the communication device 900 may perform the steps performed by the control plane network element in FIG. 5A to FIG. 7. The processor 902 is specifically configured to:

send a first configuration packet to a user plane network element by using the communication module 901, where the first configuration packet carries a plurality of first configuration parameter groups, and any one of the plurality of first configuration parameter groups belongs to one service; and receive a first configuration reply packet from the user plane network element by using the communication module 901, where the first configuration reply packet includes to-be-reported error information, the to-be-reported error information included in the first configuration reply packet includes first configuration error information, the to-be-reported error information included in the first configuration reply packet does not include second configuration error information, a reporting priority of the first configuration error information is higher than or equal to a reporting priority of the second configuration error information, and the first configuration error information is generated after the user plane network element performs configuration based on any one of the plurality of first configuration parameter groups.

For a specific function of the processor 902, refer to the descriptions in the methods provided in the foregoing embodiments and the specific function descriptions of the communication apparatus 800 in the embodiment shown in FIG. 8. Details are not described herein again.

The memory 903 is configured to store program instructions, data, and the like. Specifically, the program instructions may include program code. The program code includes computer operation instructions. The memory 903 may include a random access memory (RAM), and may further include a non-volatile memory, for example, at least one magnetic disk memory. The processor 902 executes the program instructions stored in the memory 903, and implements the foregoing functions by using the data stored in the memory 903, to implement the methods provided in the foregoing embodiments. When the units included in the communication apparatus 800 shown in FIG. 8 are implemented by using software modules, program instructions corresponding to the units may be stored in the memory 903.

It may be understood that the memory 903 in FIG. 9 in this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method in this specification is intended to include but is not limited to these memories and any memory of another suitable type.

Based on the foregoing embodiments, this application further provides a communication system in which a user plane is separated from a control plane. The communication system includes a control plane network element and a user plane network element. The control plane network element is configured to perform steps on a control plane network element side in the methods provided in the foregoing embodiments, and the user plane network element is configured to perform steps on a user plane network element side in the methods provided in the foregoing embodiments.

Based on the foregoing embodiments, this application further provides a computer program. When the computer program is run on a computer, the computer is enabled to perform the methods provided in the foregoing embodiments.

Based on the foregoing embodiments, this application further provides a computer-readable storage medium. The computer-readable storage medium stores a computer program. When the computer program is executed by a computer, the computer is enabled to perform the methods provided in the foregoing embodiments.

The storage medium may be any available medium that can be accessed by the computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can be for carrying or storing expected program code in a form of instructions or a data structure and can be accessed by the computer.

Based on the foregoing embodiments, this application further provides a chip. The chip is configured to read a computer program stored in a memory, to implement the methods provided in the foregoing embodiments.

Based on the foregoing embodiments, this application provides a chip system. The chip system includes a processor, configured to support a computer apparatus in implementing functions of the user plane network element or the control plane network element in the foregoing embodiments. In a possible design, the chip system further includes a memory. The memory is configured to store a program and data that are necessary for the computer apparatus. The chip system may include a chip, or may include the chip and another discrete component.

In conclusion, this application provides the configuration error information transmission method and the device. In the method, when generating the plurality of pieces of configuration error information after configuring the batch of configuration parameter groups, the user plane network element may report the configuration error information to the control plane network element based on the reporting priorities of the configuration error information. In the conventional method, the user plane network element can report only the configuration error information that is generated first. In comparison, in this method, reporting can be performed based on the reporting priorities of the configuration error information. In this way, the user or the control plane network element can configure, by configuring the reporting priorities, the order of precedence of the configuration error information to be reported by the user plane network element, so that flexibility of reporting the configuration error information by the user plane network element to the control plane network element is improved, and efficiency of searching for the root cause of the configuration error, locating the problem, and performing operations and maintenance by the control plane network element can be improved.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or the block diagrams of the method, the device (system), and the computer program product according to this application. It should be understood that computer program instructions may be for implementing each process and/or each block in the flowcharts and/or the block diagrams and a combination of procedures and/or blocks in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus configured to implement a specified function in one or more procedures in the flowcharts and/or in one or more blocks in the block diagrams.

The computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

The computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specified function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:
1. A method, comprising:
receiving, by a user plane network element from a control plane network element, a first configuration packet, wherein the first configuration packet indicates a plurality of configuration parameter groups, and each configuration parameter group of the plurality of configuration parameter groups belongs to a corresponding service;

generating, by the user plane network element, a plurality of pieces of configuration error information after performing configuration based on the plurality of configuration parameter groups, wherein each piece of the plurality of pieces of configuration error information corresponds to a corresponding configuration parameter group, and the each piece of the plurality of pieces of configuration error information indicates that the user plane network element fails to configure the corresponding configuration parameter group corresponding to the each piece of the plurality of pieces of configuration error information; and sending, by the user plane network element to the control plane network element, a first configuration reply packet comprising to-be-reported error information, wherein the to-be-reported error information comprises first configuration error information in the plurality of pieces of configuration error information, the to-be-reported error information excludes second configuration error information in the plurality of pieces of configuration error information, and a first reporting priority of the first configuration error information is higher than or equal to a second reporting priority of the second configuration error information, wherein the first reporting priority of the first configuration error information is of a first service to which a first configuration parameter group corresponding to the first configuration error information belongs, and the second reporting priority of the second configuration error information is of a second service to which a second configuration parameter group corresponding to the second configuration error information belongs.

2. The method according to claim 1, wherein the to-be-reported error information further comprises fourth configuration error information in the plurality of pieces of configuration error information, and a fourth service to which a fourth configuration parameter group corresponding to the fourth configuration error information belongs is different from the first service to which the first configuration parameter group corresponding to the first configuration error information belongs.

3. The method according to claim 1, further comprising:
before the sending the first configuration reply packet determining, by the user plane network element, a reporting priority of at least one service, wherein the at least one service comprises a service to which at least one of the plurality of configuration parameter groups belongs; and
determining, by the user plane network element, the to-be-reported error information in the plurality of pieces of configuration error information based on the reporting priority of the at least one service.

4. The method according to claim 3, wherein the determining the reporting priority of the at least one service comprises:
obtaining, by the user plane network element, a preset reporting priority of the at least one service;
obtaining, by the user plane network element, first priority configuration information sent by the control plane network element, wherein the first priority configuration information configures the reporting priority of the at least one service; and determining, by the user plane network element, the reporting priority of the at least one service based on the first priority configuration information; or obtaining, by the user plane network element, second priority configuration information sent by the control plane network element, wherein the second priority configuration information configures a first priority of the first service in the at least one service; determining, by the user plane network element, the first priority of the first service based on the second priority configuration information; and obtaining, by the user plane network element, a second preset reporting priority of the second service in the at least one service, or adjusting, by the user plane network element, the second reporting priority of the second service based on the first priority of the first service.

5. The method according to claim 3, wherein the determining the to-be-reported error information in the plurality of pieces of configuration error information based on the reporting priority of the at least one service comprises:
determining, by the user plane network element, the to-be-reported error information in the plurality of pieces of configuration error information based on the reporting priority of the at least one service and a constraint condition, wherein the constraint condition is that a quantity of pieces of the to-be-reported error information is a target quantity; or
the constraint condition is whether a quantity of services to which a configuration parameter group corresponding to the to-be-reported error information belongs is the target quantity.

6. The method according to claim 5, wherein based on the constraint condition is that the quantity of pieces of the to-be-reported error information is the target quantity, the determining the to-be-reported error information in the plurality of pieces of configuration error information based on the reporting priority of the at least one service and the constraint condition comprises:
adding, by the user plane network element, the first configuration error information to a reporting record based on a quantity of pieces of the configuration error information in the reporting record is less than the target quantity, or
based on the quantity of pieces of the configuration error information in the reporting record is equal to the target quantity:
determining, by the user plane network element, that the first reporting priority of the first configuration error information is higher than a third reporting priority of third configuration error information in the reporting record,
deleting, by the user plane network element, the third configuration error information in the reporting record, and
adding the first configuration error information to the reporting record; and
determining, by the user plane network element, that the to-be-reported error information is the configuration error information in the reporting record.

7. The method according to claim 5, wherein the target quantity is determined based on a maximum quantity of alarm messages of the user plane network element that can be stored by the control plane network element, and the alarm messages are generated by the control plane network element based on the to-be-reported error information reported by the user plane network element, or wherein the target quantity is determined based on a maximum volume of data carried by the first configuration reply packet.

8. The method according to claim 7, wherein when the target quantity is determined based on the maximum quantity of alarm messages of the user plane network element that can be stored by the control plane network element, the target quantity is greater than or equal to the maximum quantity.

9. A method, comprising:
sending, by a control plane network element, a first configuration packet to a user plane network element, wherein the first configuration packet indicates a plurality of first configuration parameter groups, and each configuration parameter group of the plurality of first configuration parameter groups belongs to a corresponding service; and
receiving, by the control plane network element, a first configuration reply packet from the user plane network element, wherein the first configuration reply packet comprises to-be-reported error information, the to-be-reported error information comprised in the first configuration reply packet comprises first configuration error information, the to-be-reported error information in the first configuration reply packet excludes second configuration error information, a first reporting priority of the first configuration error information is higher than or equal to a second reporting priority of the second configuration error information, and the first configuration error information is generated after the user plane network element performs configuration based on one of the plurality of first configuration parameter groups,
wherein the first reporting priority of the first configuration error information is of a first service to which a first configuration parameter group corresponding to the first configuration error information belongs, and the second reporting priority of the second configuration error information is of a second service to which a second configuration parameter group corresponding to the second configuration error information belongs.

10. The method according to claim 9, wherein the method further comprises:
sending, by the control plane network element, priority configuration information to the user plane network element, wherein the priority configuration information configures a reporting priority of at least one service, and the at least one service comprises a service to which at least one of the plurality of first configuration parameter groups belongs.

11. The method according to claim 9, wherein a quantity of pieces of the to-be-reported error information is a target quantity; or a quantity of services to which a configuration parameter group corresponding to the to-be-reported error information belongs is the target quantity.

12. The method according to claim 11, wherein the target quantity is determined based on a maximum quantity of alarm messages of the user plane network element that can be stored by the control plane network element, and the alarm messages are generated by the control plane network element based on the to-be-reported error information reported by the user plane network element, or wherein the target quantity is determined based on a maximum volume of data carried by the first configuration reply packet.

13. The method according to claim 12, wherein when the target quantity is determined based on the maximum quantity of alarm messages of the user plane network element that can be stored by the control plane network element, the target quantity is greater than or equal to the maximum quantity.

14. The method according to claim 9, wherein the method further comprises:
after the receiving, by the control plane network element, the first configuration reply packet from the user plane network element:
generating, by the control plane network element, a configuration failure record of the user plane network element based on first to-be-reported error information; and
generating, by the control plane network element, at least one alarm message of the user plane network element based on the configuration failure record.

15. The method according to claim 14, wherein the first to-be-reported error information comprises the first configuration error information and third configuration error information, wherein a first configuration parameter group corresponding to the first configuration error information belongs to the first service, and a third configuration parameter group corresponding to the third configuration error information belongs to the second service; and the configuration failure record indicates that the first configuration parameter group of the first service and the third configuration parameter group of the second service fail to be configured, and
wherein the at least one alarm message comprises a first alarm message and a second alarm message, the first alarm message alarming a first configuration failure of the first configuration parameter group of the first service, and the second alarm message alarming a second configuration failure of the second configuration parameter group of the second service.

16. The method according to claim 9, wherein the method further comprises:
obtaining, by the control plane network element, target configuration information, wherein the target configuration information comprises a plurality of configuration parameter groups;
determining, by the control plane network element, the plurality of first configuration parameter groups and a plurality of second configuration parameter groups in the plurality of configuration parameter groups in the target configuration information, wherein each configuration parameter group of the plurality of first configuration parameter groups is different from each configuration parameter group of the plurality of second configuration parameter groups;
sending, by the control plane network element, a second configuration packet to the user plane network element, wherein the second configuration packet indicates the plurality of second configuration parameter groups; and
receiving, by the control plane network element, a second configuration reply packet from the user plane network element, wherein the second configuration reply packet comprises second to-be-reported error information, and the second to-be-reported error information in the second configuration reply packet is generated after the user plane network element performs second configuration based on at least one of the plurality of second configuration parameter groups.

17. The method according to claim 16, wherein the obtaining, by the control plane network element, the target configuration information comprises:

obtaining, by the control plane network element, the target configuration information sent by a management device;

obtaining, by the control plane network element, the target configuration information input by a user; or obtaining, by the control plane network element, the target configuration information in a configuration consistency verification process of the control plane network element and the user plane network element.

18. A user plane network element, comprising:

at least one processor; and a non-transitory computer readable storage medium storing programming, the programming including instructions that, when executed by the at least one processor, cause the user plane network element to perform operations including:

receiving, from a control plane network element, a first configuration packet, wherein the first configuration packet indicates a plurality of configuration parameter groups, and each configuration parameter group of the plurality of configuration parameter groups belongs to a corresponding service;

generating a plurality of pieces of configuration error information after performing configuration based on the plurality of configuration parameter groups, wherein each piece of the plurality of pieces of configuration error information corresponds to a corresponding configuration parameter group, and the each piece of the plurality of pieces of configuration error information indicates that the user plane network element fails to configure the corresponding configuration parameter group corresponding to the each piece of the plurality of pieces of configuration error information; and sending, to the control plane network element, a first configuration reply packet comprising to-be-reported error information, wherein the to-be-reported error information comprises first configuration error information in the plurality of pieces of configuration error information, the to-be-reported error information excludes second configuration error information in the plurality of pieces of configuration error information, and a first reporting priority of the first configuration error information is higher than or equal to a second reporting priority of the second configuration error information, wherein the first reporting priority of the first configuration error information is of a first service to which a first configuration parameter group corresponding to the first configuration error information belongs, and the second reporting priority of the second configuration error information is of a second service to which a second configuration parameter group corresponding to the second configuration error information belongs.

* * * * *

UNITED STATES PATENT AND TRADEMARK OFFICE
CERTIFICATE OF CORRECTION

| | | |
|---|---|---|
| PATENT NO. | : 11,888,678 B2 | Page 1 of 1 |
| APPLICATION NO. | : 18/173868 | |
| DATED | : January 30, 2024 | |
| INVENTOR(S) | : Wu et al. | |

It is certified that error appears in the above-identified patent and that said Letters Patent is hereby corrected as shown below:

In the Claims

In Column 38, in Claim 14, Line 8, delete "element:" and insert -- element; --.

Signed and Sealed this
Ninth Day of April, 2024

Katherine Kelly Vidal
*Director of the United States Patent and Trademark Office*